United States Patent
Goyal et al.

(10) Patent No.: US 11,409,771 B1
(45) Date of Patent: Aug. 9, 2022

(54) SPLITTING PARTITIONS ACROSS CLUSTERS IN A TIME-SERIES DATABASE

(71) Applicant: Amazon Technologies, Inc., Seattle, WA (US)

(72) Inventors: Dumanshu Goyal, Seattle, WA (US); Zhong Ren, Seattle, WA (US); Nirmesh Khandelwal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 16/831,599

(22) Filed: Mar. 26, 2020

(51) Int. Cl.
  *G06F 16/28* (2019.01)
  *G06F 16/2455* (2019.01)
  *G06F 16/22* (2019.01)

(52) U.S. Cl.
  CPC ........ *G06F 16/285* (2019.01); *G06F 16/2228* (2019.01); *G06F 16/24554* (2019.01)

(58) Field of Classification Search
  CPC .............. G06F 16/285; G06F 16/2228; G06F 16/22554
  USPC ........................................................ 707/661
  See application file for complete search history.

(56) References Cited

U.S. PATENT DOCUMENTS

| | | |
|---|---|---|
| 6,658,417 B1 | 12/2003 | Stakutis et al. |
| 7,624,118 B2 | 11/2009 | Schipunov et al. |
| 8,132,046 B2 | 3/2012 | Varghese |
| 8,276,154 B2 | 9/2012 | Toub et al. |
| 8,335,765 B2 | 12/2012 | Sivasubramanian et al. |
| 8,386,540 B1 | 2/2013 | McAlister et al. |
| 8,595,547 B1 | 11/2013 | Sivasubramanian et al. |
| 8,601,112 B1 | 12/2013 | Nordstrom et al. |
| 8,914,340 B2 | 12/2014 | Ash et al. |
| 9,128,965 B1 | 9/2015 | Yanacek et al. |
| 9,286,001 B2 | 3/2016 | Skjolsvold et al. |
| 9,432,305 B1 | 8/2016 | Das et al. |
| 9,449,122 B2 | 9/2016 | Haas et al. |
| 9,602,590 B1 | 3/2017 | Lu et al. |
| 9,607,019 B1 | 3/2017 | Swift et al. |

(Continued)

OTHER PUBLICATIONS

U.S. Appl. No. 16/831,637, filed Mar. 26, 2020, Dumanshu Goyal et al.

(Continued)

*Primary Examiner* — Syling Yen
(74) *Attorney, Agent, or Firm* — Robert C. Kowert; Kowert, Hood, Munyon, Rankin & Goetzel, P.C.

(57) ABSTRACT

Methods, systems, and computer-readable media for splitting partitions across database clusters in a time-series database are disclosed. A time-series database determines that a heat metric for the first tile has exceeded a threshold. The first tile represents spatial boundaries and temporal boundaries of time-series data, and a lease for the first tile is assigned to a storage node. Based (at least in part) on the heat metric, a temporal split of the first tile is performed to generate an intermediate tile representing the spatial boundaries and a later portion of the temporal boundaries. A spatial split of the intermediate tile is performed to generate second and third tiles representing two portions of the spatial boundaries and the later portion of the temporal boundaries. The storage node stores elements of the time-series data within these new boundaries to the second and third tiles.

20 Claims, 25 Drawing Sheets

(56) References Cited

U.S. PATENT DOCUMENTS

| | | |
|---|---|---|
| 9,607,067 B2 | 3/2017 | Haas et al. |
| 9,626,374 B2 | 4/2017 | Hirsch et al. |
| 9,672,257 B2 | 6/2017 | Tobin et al. |
| 9,773,015 B2 | 9/2017 | Guo et al. |
| 9,817,727 B2 | 11/2017 | McAlister et al. |
| 9,836,492 B1 | 12/2017 | Hermanson |
| 9,934,107 B1 | 4/2018 | Chikkanayakanahally et al. |
| 10,007,513 B2 | 6/2018 | Malladi et al. |
| 10,073,897 B2 | 9/2018 | Brown et al. |
| 10,162,875 B2 | 12/2018 | Hattori |
| 10,360,057 B1 | 7/2019 | Vashishtha et al. |
| 10,496,927 B2 | 12/2019 | Achin et al. |
| 10,685,041 B2 | 6/2020 | Hattori |
| 2005/0038834 A1 | 2/2005 | Souder et al. |
| 2011/0010514 A1 | 1/2011 | Benhase et al. |
| 2012/0131093 A1 | 5/2012 | Hamano et al. |
| 2012/0240768 A1 | 9/2012 | Mann et al. |
| 2015/0052173 A1 | 2/2015 | Leonard et al. |
| 2017/0161661 A1* | 6/2017 | Dannecker .......... G06F 16/2453 |
| 2017/0262524 A1 | 9/2017 | Cho et al. |
| 2018/0107390 A1 | 4/2018 | Bae et al. |
| 2018/0157729 A1 | 6/2018 | Lee |
| 2018/0341728 A1 | 11/2018 | Micou et al. |
| 2019/0065275 A1 | 2/2019 | Wong et al. |
| 2019/0342160 A1 | 11/2019 | Baddepudi et al. |
| 2020/0068038 A1 | 2/2020 | Xing et al. |
| 2020/0310654 A1* | 10/2020 | Meiri .................... G06F 3/0604 |
| 2021/0303631 A1 | 9/2021 | Grebenisan et al. |

OTHER PUBLICATIONS

U.S. Appl. No. 16/831,608, filed Mar. 26, 2020, Dumanshu Goyal et al.

U.S. Appl. No. 16/831,614, filed Mar. 26, 2020. Dumanshu Goyal et al.

U.S. Appl. No. 16/116,791, filed Aug. 29, 2018, Mustafa Ozan Ozen et al.

U.S. Appl. No. 16/216,580, filed Dec. 11, 2018, Dumanshu Goyal et al.

U.S. Appl. No. 16/176,629, filed Oct. 31, 2018, Dumanshu Goyal.

U.S. Appl. No. 16/199,102, filed Nov. 23, 2018, Timothy A. Rath.

U.S. Appl. No. 16/199,103, filed Nov. 23, 2018, Timothy A. Rath.

U.S. Appl. No. 16/199,078, filed Nov. 23, 2018, Timothy A. Rath.

U.S. Appl. No. 16/267,330, filed Feb. 4, 2019, Dumanshu Goyal.

U.S. Appl. No. 16/219,686, filed Dec. 13, 2018, Dumanshu Goyal et al.

U.S. Appl. No. 16/287,822, filed Feb. 27, 2019, Dumanshu Goyal.

U.S. Appl. No. 16/453,914, filed Jun. 26, 2019, Guarav Saxena et al.

U.S. Appl. No. 16/455,591, filed Jun. 27, 2019, Gaurav Saxena et al.

U.S. Appl. No. 16/579,715, filed Sep. 23, 2019, Dumanshu Goyal.

U.S. Appl. No. 16/579,717, filed Sep. 23, 2019, Dumanshu Doyal et al.

* cited by examiner

US 11,409,771 B1

SPLITTING PARTITIONS ACROSS CLUSTERS IN A TIME-SERIES DATABASE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
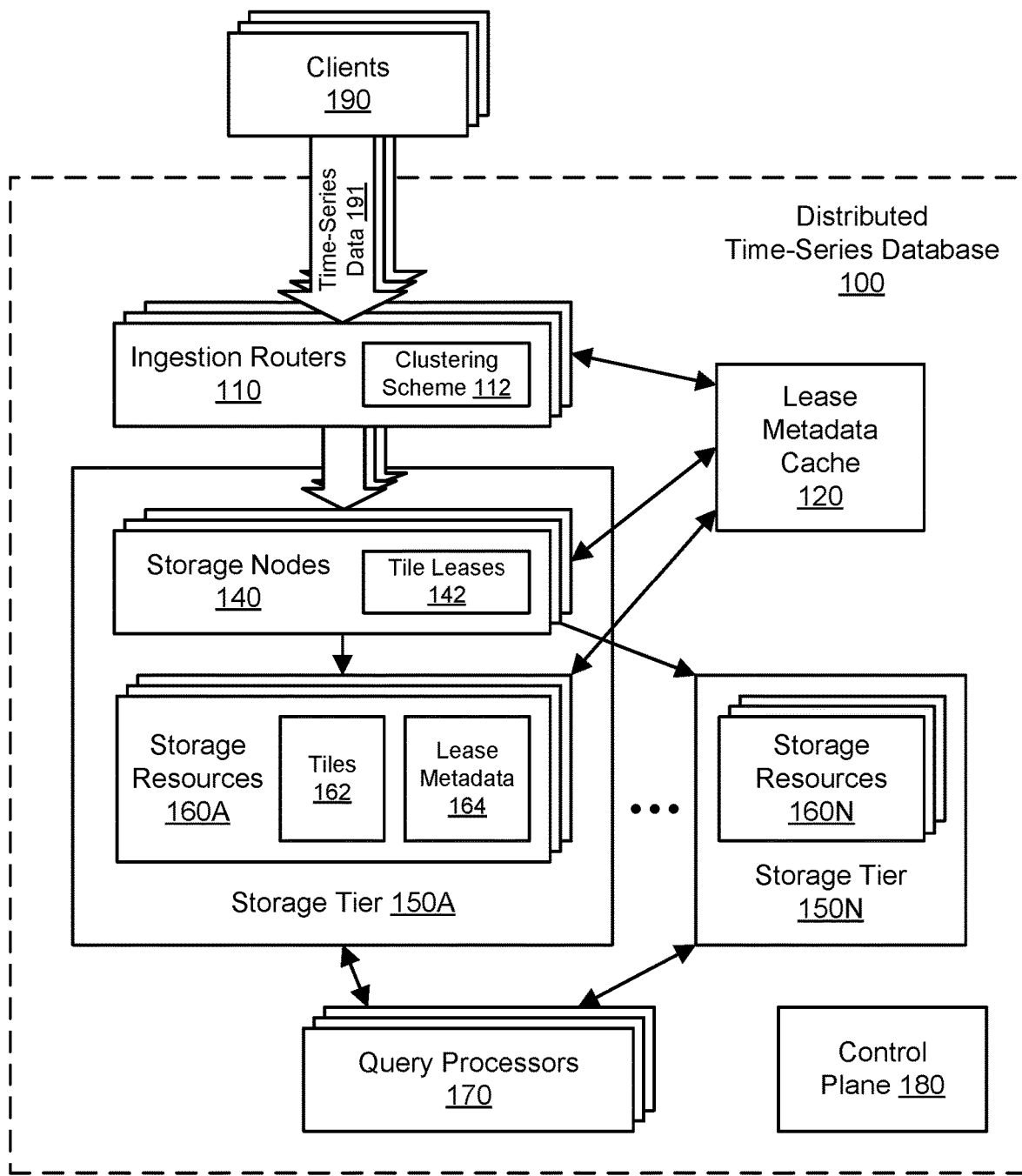
FIG. 1 illustrates an example system environment for a distributed time-series database including tile leases, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

A distributed time-series database hosted in the cloud may offer high availability and high throughput for multiple clients. The time-series database may include a set of ingestion routers that receive and spatially partition time-series data into a set of non-overlapping partitions. A particular time series may be defined by a schema that includes components such as one or more dimension names and a measure name. The time-series database may further include a set of storage nodes that process the partitioned time-series data. For example, the storage nodes may write elements of time-series data to one or more storage tiers, such as a "hot" tier that offers low-latency and high-availability write and read access to a set of distributed storage resources (e.g., as implemented using database clusters). In the hot tier, time-series data may be stored in two-dimensional tiles which are defined by spatial and temporal boundaries. The time-series database may further include a set of query processors that perform queries of the time-series data in the one or more storage tiers.

Embodiments of methods, systems, and computer-readable media for dynamic lease assignments in a time-series database are described. A lease to a given tile in a storage tier may be assigned to one of the storage nodes. A tile lease may permit a particular storage node to write time-series data to that tile, to the exclusion of other storage nodes at a given time. Tile leases may be assigned initially to storage nodes on a random or pseudo-random basis, and a refinement mechanism may be used to reassign leases for heat balancing across the fleet of storage nodes. Lease acquisition by storage nodes may be performed quickly and dynamically and without necessarily using a control plane. Leases may be acquired by other storage nodes after a time-based lock has expired. Ingested time-series data may be routed to storage nodes based (at least in part) on the tile leases. The storage resources (e.g., database clusters) of the storage tier may store tile lease metadata describing aspects of tile leases. The storage resources may use this lease metadata to approve or deny requests from particular storage nodes to write time-series data to particular tiles. Lease metadata (e.g., assignment of particular leases to particular storage nodes) may be cached using a centralized component to facilitate the propagation of updates.

Embodiments of methods, systems, and computer-readable media for splitting and merging partitions across database clusters in a time-series database are described. In a hot storage tier, time-series data may be partitioned along spatial and temporal boundaries into two-dimensional tiles that are stored in a set of database clusters. When the heat at a particular tile exceeds a threshold, the database may split the tile in a manner that minimizes data movement from database cluster to database cluster. The database may first perform a temporal split to generate an intermediate tile representing the same spatial boundaries but a later portion of the temporal boundaries. The temporal split may also generate a modified version of the original tile with the same spatial boundaries but an earlier portion of the temporal boundaries. For tiles whose temporal boundaries are not entirely in the past, the temporal split point may be selected at a time at or after the current time. No data may be written to the intermediate tile, and in some embodiments, no tile metadata may be created for the intermediate tile. The intermediate tile may then be split spatially into two additional tiles representing different portions of the original spatial boundaries along with the later (future) portion of the original temporal boundaries. The temporal split and spatial split may be performed as a two-stage but atomic operation. This two-stage split may minimize data movement such that newly ingested time-series data can be routed to the new tiles resulting from the split, while older time-series data need not be moved from the original tile to a different database cluster. Tile merges may be performed in a similar manner, with two tiles with low heat and adjacent spatial boundaries being first split temporally, and the two new tiles representing the later portions of the temporal range then being merged.

Embodiments of methods, systems, and computer-readable media for heat balancing in a time-series database are described. To maintain the high availability of the time-series database, components and resources at various levels may be subjected to heat balancing. A fleet of storage nodes may hold leases to write time-series data to two-dimensional tiles in database clusters. Individual storage nodes may track their own heat or usage metrics. If the heat for a storage node exceeds a threshold, then the storage node may identify a candidate set of other storage nodes, select the one with the lowest heat, and reassign one or more leases to that other storage node. Individual database clusters may track their own heat or usage metrics. If the heat for a database cluster exceeds a threshold, then the cluster may split a tile temporally such that new data for the tile is written to another cluster. Storage nodes may maintain connections to database clusters that host tiles for which the storage nodes hold leases. If many storage nodes each have connections to many database clusters, some clusters may be overloaded due to connection overhead and/or connection constraints. The database connection mesh may be managed by having storage nodes exchange leases to reduce the number of concurrent connections.

As one skilled in the art will appreciate in light of this disclosure, embodiments may be capable of achieving certain technical advantages, including some or all of the following: (1) improving the availability of a distributed time-series database by assigning tile leases to individual storage nodes as an inline data path operation and not involving a control plane; (2) improving the fault tolerance of a distributed time-series database by permitting individual storage nodes to acquire tile leases held by other storage nodes; (3) improving the performance of a distributed time-series database by assigning tile leases on a random basis with a refinement mechanism for load balancing; (4) reducing the use of network bandwidth in a distributed time-series database by minimizing data movement between database clusters for tile splits; (5) reducing the use of network bandwidth in a distributed time-series database by minimizing data movement between database clusters for tile merges; (6) improving the performance of queries in a distributed time-series database by leaving time-series data in place during tile splits that involve multiple database clusters; (7) improving the performance of queries in a distributed time-series database by leaving time-series data in place during tile merges that involve multiple database clusters; (8) improving the performance and availability of a distributed time-series database by performing heat balancing among storage nodes; (9) improving the performance and availability of a distributed time-series database by performing heat balancing among database clusters; (10) improving the performance and availability of a distributed time-series database by using tile lease exchanges to reduce the number of database connections from storage nodes to database clusters; and so on.

FIG. 1 illustrates an example system environment for a distributed time-series database including tile leases, according to some embodiments. A distributed time-series database 100 may ingest and store time-series data 191 and make the stored data available for queries and other computations and tasks. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data. Using the techniques described herein, the same or similar scaling approaches may be used for time-series metadata (e.g., schema metadata) as for time-series data.

The ingested time-series data 191 may represent a large number (high cardinality) of individual time series. An individual time series may include a sequence of values or observations (e.g., for a feature of a system or a phenomenon) that can be plotted over time. An individual time series may be uniquely identified by a set of dimensions (with dimension values) such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on, as well as the measure name. In one embodiment, any change to such a dimension may produce a new time series in the database 100.

The database 100 may manage a large amount of time-series data throughout the lifecycle of the data. The times-series data 191 may be received at the database 100 using a fleet of hosts referred to as ingestion routers 110. The time-series data may typically arrive at the database 100 in time order, but the database may be able to ingest out-of-order data as well. The ingestion routers 110 may divide the data 191 from the clients 190 into non-overlapping ingestion partitions. In one embodiment, the ingested data may be spatially partitioned along non-overlapping spatial boundaries according to the time series or range of the data, one or more tags associated with the data, the region that produced the data, the category to which the data belongs, and/or other suitable metadata. Ingested time-series data may be mapped to different partitions based on hierarchical clustering in order to achieve better performance of data storage and retrieval. A partition may include one time series or multiple time series.

A particular time series may be defined by a schema that includes components such as one or more dimension names (e.g., "Region") having one or more dimension values (e.g., "US-West") and a measure name (e.g., "temperature"). As ingested by the time-series database 100, an element of time-series data may include all the schema components (including dimension values) as well as a measure value that represents a particular data point in the time series. The time-series database 100 may be referred to as "schema-less" in that a customer need not formally specify the schema using a control plane 180 or other channel separate from the ingested data 191. Thus clients 190 may begin providing the data 191 to the database 100 more quickly and without performing additional control-plane operations or other configuration tasks.

The ingestion routers 110 may use a clustering scheme 112 to divide the ingested data 191 into various partitions. The clustering scheme 112 may co-locate related time series for optimization of queries and other tasks. The clustering scheme 112 may represent a multi-level hashing scheme in which a hash value for a time series is generated by concatenating hash values for different components of the schema (and dimension values) for the time series. The clustering scheme 112 may be based (at least in part) on schemas and dimension values for individual time series that are derived from ingested data 191 and not necessarily formally specified by customers. For example, to generate a hash representing an individual time series, a clustering scheme 112 for a particular table may first hash the measure name for the various time series, then concatenate a hash for the dimension names, then concatenate a hash for the dimension values. By representing the measure name as a prefix in the hash for an individual time series, various time series that have the same measure name may be clustered together in the partitions and throughout their remaining lifecycle in the database 100. As another example, another clustering scheme 112 may first hash the dimension names, then concatenate a hash for the dimension values, then concatenate a hash for the measure name. As yet another example, another clustering scheme 112 may interleave the dimension names and dimension values (e.g., a hash of a first dimension name, a hash of a first dimension value, a hash of a second dimension name, a hash of a second dimension value, and so on) and then concatenate a hash for the measure name. In one embodiment, the clustering scheme 112 may represent a default scheme that is intended to optimize query performance for a large number (e.g., a majority) of queries for a given table. In one embodiment, the clustering scheme 112 may be selected by a customer, e.g., on a table-by-table basis.

In addition to the ingestion routers 110, the database 100 may include hosts such as storage nodes 140 and query processors 170. A fleet of storage nodes 140 may take the partitioned time-series data from the ingestion routers 110, potentially process the data in various ways, and add the data to one or more storage tiers 150A-150N. For example, the storage nodes 140 may write data from one partition to a "hot" storage tier 150A at a lower latency and to a "cold" storage tier 150N at a higher latency. In various embodiments, storage nodes may perform reordering, deduplication, aggregation of different time periods, rollups, and other transformations on time series data. Storage nodes 140 may perform tasks such as creating materialized views or derived tables based on a partition, such as an aggregation or rollup of a time interval. The tasks may include continuous queries that are performed repeatedly over time, e.g., to create aggregations for each hour or day of a time series as that time period is finalized. By co-locating related time-series using the clustering scheme 112, tasks such as aggregations and cross-series rollups may be optimized or otherwise have their performance improved.

The data 191 may be routed from the routers 110 to the storage nodes 140 according to routing metadata, e.g., that maps different time series or ranges of the data to different storage nodes. In one embodiment, the routing metadata may represent the assignment of tile leases to particular storage nodes. In one embodiment, a given storage node may be assigned to one and only one partition at a time. In one embodiment, the storage nodes 140 may organize the time series in tables. The storage nodes 140 may also be referred to as writers or table builders. A table may store multiple time series. A table may be a named entity that stores related time series that are usable by the same application and often managed by the same customer of the database 100. A data point (e.g., an element) in a time series may be stored in a record. Data points or elements of time-series data may be added to the database 100 using application programming interface (API) calls or other programmatic interfaces. In one embodiment, data points for multiple time series (e.g., for related time series generated by the same client device) with the same timestamp may be added by a client using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may often have numeric values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, queries may specify time intervals and/or dimension names and/or dimension values instead of or in addition to individual measures.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits customers (e.g., developers of applications) and other systems to perform management and modeling of time series data. For example, a component for time-series data management of the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, for example, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, customers may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. Query processors 170 may perform tasks such as one-time queries of time-series data in one or more storage tiers 150A-150N, transformations of time-series data, and other computations. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

Using the clustering scheme 112, various time series that are similar (e.g., that have the same measure name) may be clustered together in the storage tier(s) 150A-150N. Queries for time-series data having the same measure name (or other hash prefix in the selected clustering scheme) may then be performed more efficiently. The same clustering scheme 112 may be used throughout the database 100 to optimize both storage and retrieval of time-series data. For example, one of the query processors 170 may use the same clustering (hashing) scheme 112 to identify the partition(s) associated with the hash of the measure name (or other prefix of the partition hash) and implement the query only using the identified partition(s) in the relevant storage tier(s).

In one embodiment, one or more components of the distributed database 100, such as hosts 110, 140 and 170, other compute instances, and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, storage nodes 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as the distributed database 100, may be offered to clients in exchange for fees.

In one or more of the storage tiers such as tier 150A, the time-series data may be partitioned into a set of tiles 162 along non-overlapping temporal and spatial boundaries. A tile may thus represent a partition of time-series data within a time range (between a starting time and an ending time) and within a range of keys. The storage resources 160A for such a tier 150A may also include a set of storage nodes that are distributed across various data centers, availability zones, or other logical or geographical locations. A tile may be replicated across the storage nodes with a group of replicas (e.g., three replicas) that are eventually consistent without using a server-side consensus mechanism. The storage tier 150A may use a plurality of database clusters to store time-series data, e.g., using two-dimensional tiles 162.

In some embodiments, a lease to a given tile may be assigned to one and only one of the storage nodes 140 at a given time. A tile lease may permit a particular storage node to write time-series data to that tile, to the exclusion of other storage nodes. A tile lease may last indefinitely, e.g., until the tile expires (and is removed from the storage tier 150A) or another storage node acquires the lease. The storage resources 160A (e.g., database clusters) of the storage tier 150A may store tile lease metadata 164 describing aspects of tile leases. The storage resources 160A (e.g., database clusters) of the storage tier 150A may use the lease metadata 164 to approve or deny requests from particular storage nodes to write time-series data to particular tiles. For example, the lease metadata 164 may indicate lease identifiers, storage node identifiers, and/or other information usable to approve or deny requests to write time-series data to particular tiles. As discussed herein, tile leases may be assigned to storage nodes using inline data path operations and not necessarily requiring use of the control plane 180. Tile leases may be assigned initially on a random (or pseudo-random) basis, and a refinement mechanism may be used for heat balancing among storage nodes. Aspects of the lease metadata (e.g., the assignment of particular leases to particular storage nodes) may be stored using a centralized lease metadata cache 120 to facilitate the propagation of updates among the ingestion routers 110, storage nodes 140, and database clusters 160A.

Figure 16:
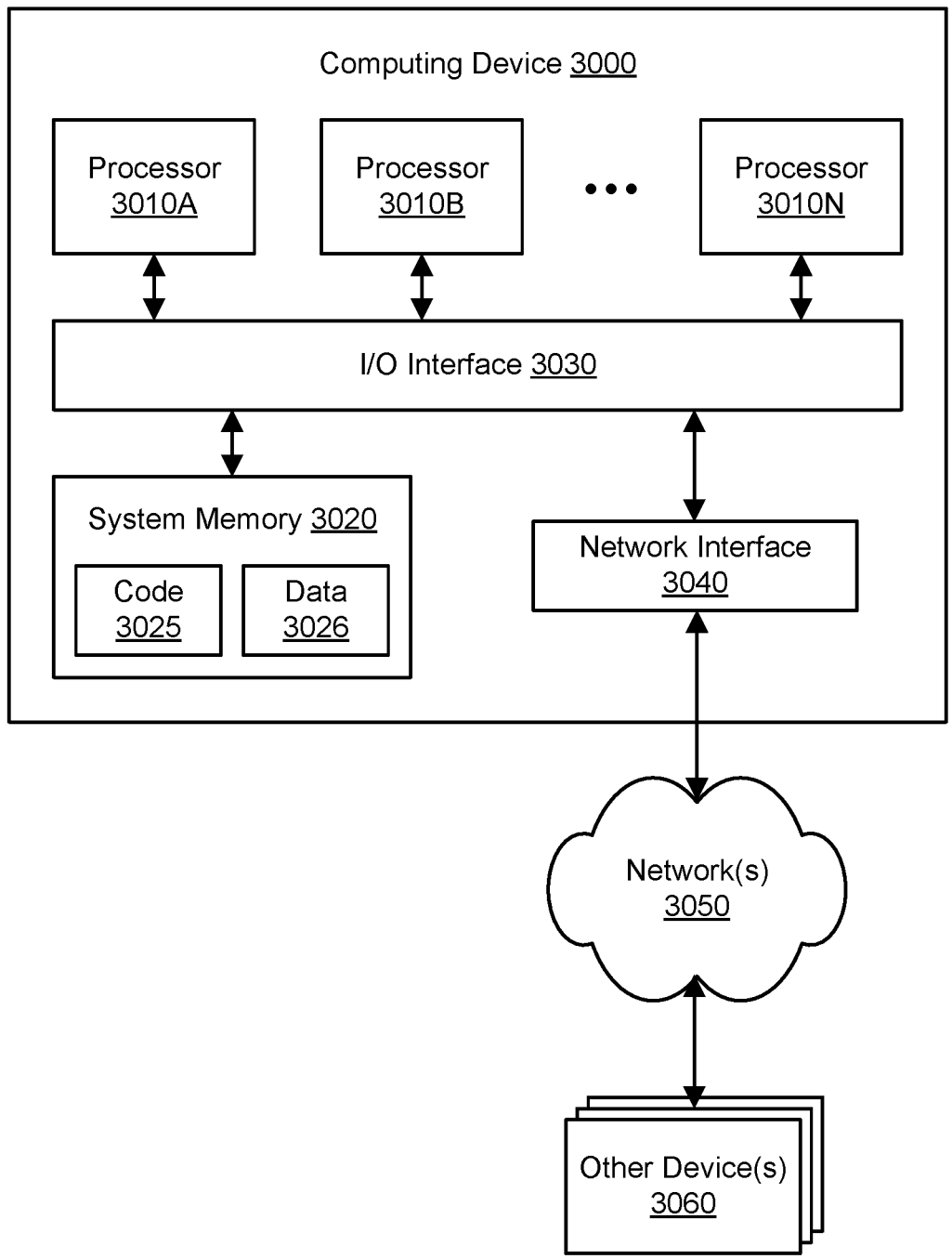
FIG. 16 illustrates an example computing device that may be used in some embodiments.

In various embodiments, components of the distributed database 100, such as the ingestion routers 110, streaming service 120, storage nodes 140, storage resources 160A-160N, query processors 170, and/or control plane 180 may be implemented using any suitable number and configuration of computing devices, any of which may be implemented by the example computing device 3000 illustrated in FIG. 16. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. Client devices 190 may be managed or owned by one or more customers of the database 100. For example, a particular customer may be a business that sells sensor devices for installation in residences and businesses, and those sensor devices may represent the client devices 190. In one embodiment, the client devices may be implemented using any suitable number and configuration of computing devices, any of which may be implemented by the example computing device 3000 illustrated in FIG. 16. Clients 190 may convey network-based service requests to the ingestion router fleet 110 via one or more networks, e.g., to supply a stream of data for processing using the storage nodes 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
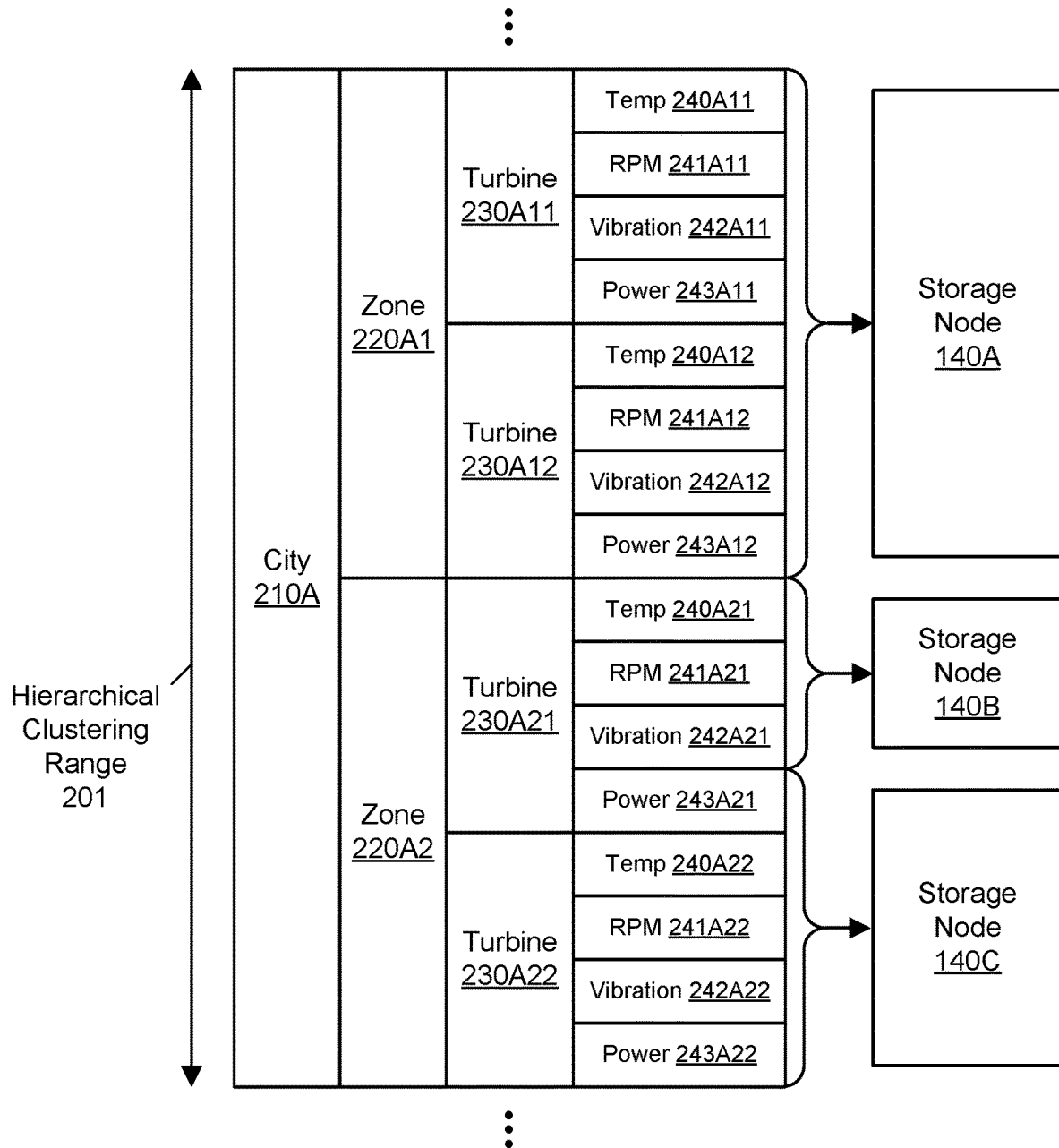
FIG. 2 illustrates an example of hierarchical clustering of ingested time-series data in a distributed time-series database including tile leases, according to some embodiments.

FIG. 2 illustrates an example of hierarchical clustering of ingested time-series data in a distributed time-series database including tile leases, according to some embodiments. The ingestion routers 110 may organize time-series data along a hierarchical clustering range 201. Some time series may be related to other time series via a hierarchy. Using hierarchical clustering, related time series may be placed near each other throughout their lifecycle in the time-series database 100. The use of hierarchical clustering may achieve a higher degree of compression for time-series data as well as lower latency for queries. The hierarchy may be specified by clients 190 or may be inferred automatically using contextual information, such as the geographical proximity of different time series, the generation of different time series by the same client device, and so on. The ingestion routers 110 may tag incoming data points so that hierarchically related series are co-located properly. A hash-based clustering scheme may be used at various stages of the database 100 to enforce the hierarchical clustering. The hash-based clustering scheme may have multiple levels.

As shown in the example of FIG. 2, an example of a hierarchical relationship path for client devices representing wind-turbine sensors may be Country, State, City, Zone, Wind Turbine, and Metric. A portion of data having this hierarchical scheme may include data for a particular city 210A, two zones 220A1 and 220A2, and two turbines per zone 230A11, 230A12, 230A21, and 230A22. Turbine 230A11 may include measurements for temperature 240A11, RPM 241A11, vibration 242A11, and power 243A11. Turbine 230A12 may include measurements for temperature 240A12, RPM 241A12, vibration 242A12, and power 243A12. Turbine 230A21 may include measurements for temperature 240A21, RPM 241A21, vibration 242A21, and power 243A21. Turbine 230A22 may include measurements for temperature 240A22, RPM 241A22, vibration 242A22, and power 243A22. A hash-based clustering scheme supporting this hierarchy may co-locate all measurements for a given wind turbine, all wind turbines for a given zone, and so on. In one embodiment, all metrics of all wind turbines in a zone/city/state may be clustered together. In one embodiment, the hierarchical clustering may be changed over time and in response to query workloads in order to reduce the latency of queries. For example, the example data of FIG. 2 may be reorganized (for future data points) with temp, RPM, vibration, and power as higher-level constructs than the turbine identifiers.

The data points for the hierarchy shown in FIG. 2 may be mapped to various durable partitions by the ingestion routers 110. As shown in the example, the time-series data may be mapped and routed to storage nodes 140A, 140B, and 140C. In one embodiment, different numbers of time series may be mapped to different partitions based (at least in part) on the ingestion rate of those time series. Partitions may be split or merged as appropriate to adapt to changing ingestion rates for various time series. A particular partition may be routed to a particular storage node, e.g., for writing data from the partition to a particular storage tier. As shown in the example of FIG. 2, a first partition may be routed to storage node 140A, another partition may be routed to storage node 140B, and yet another partition may be routed to storage node 140C.

Figure 3:
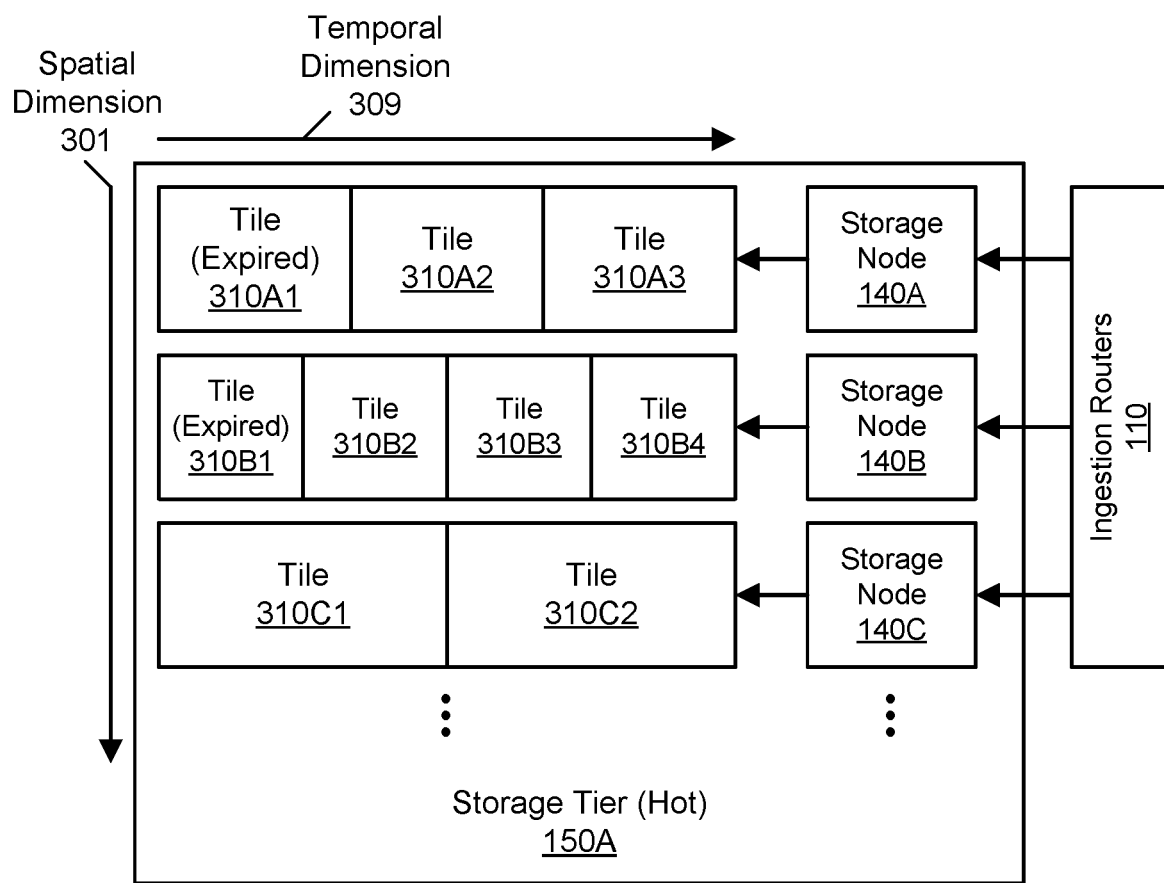
FIG. 3 illustrates an example of storage of time-series data using two-dimensional tiles in a hot tier in a distributed time-series database including tile leases, according to some embodiments.

FIG. 3 illustrates an example of storage of time-series data using two-dimensional tiles in a hot tier in a distributed time-series database including tile leases, according to some embodiments. As discussed above, the database 100 may include a hot storage tier such as tier 150A that stores recent data with high availability and low latency. In one embodiment, the hot tier 150A may include a set of storage resources 160A such as database clusters that include computational resources and memory resources. The database clusters may store time-series data using tiles that are generated or appended to by storage nodes 140. Tiles may be stored using storage resources such as memory (e.g., RAM) and/or solid-state drives for lower latency of storage and retrieval. Tiles may be replicated across different storage resources of clusters (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on schema-based clustering that seeks to co-locate related time series in the same partition, and the schema-based clustering may be performed by the ingestion routers 110. Tiles may also be partitioned along non-overlapping temporal boundaries. Due to the spatial dimension 301 and the temporal dimension 309, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ. In one embodiment, if the clustering scheme is changed, then subsequent tiles may be reorganized to reflect the clustering change over time.

In the example of FIG. 3, a set of time series may be routed to storage nodes 140A, 140B, and 140C based on a spatial range (e.g., using schema-based clustering). Particular partitions of time-series data may be mapped to particular storage nodes for writing data from the partitions to the hot tier 150A. For example, one partition may be assigned to storage node 140A that writes to the hot tier, another partition may be assigned to storage node 140B that writes to the hot tier, and yet another partition may be assigned to storage node 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the storage node for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 3, storage node 140A may write to an open tile 310A3 that was preceded in time by a tile 310A2 that was preceded in time by a now-expired tile 310A. Similarly, storage node 140B may write to an open tile 310B4 that was preceded in time by a tile 310B3 that was preceded in time by a tile 310B2 that was preceded in time by a now-expired tile 310B1. Additionally, storage node 140C may write to an open tile 310C2 that was preceded in time by a tile 310C1. As discussed above, the contents of a tile may be replicated (e.g., using three replicas) across different location or zones to achieve greater durability within the hot tier.

Dynamic Lease Assignments in a Time-Series Database

Figure 4:
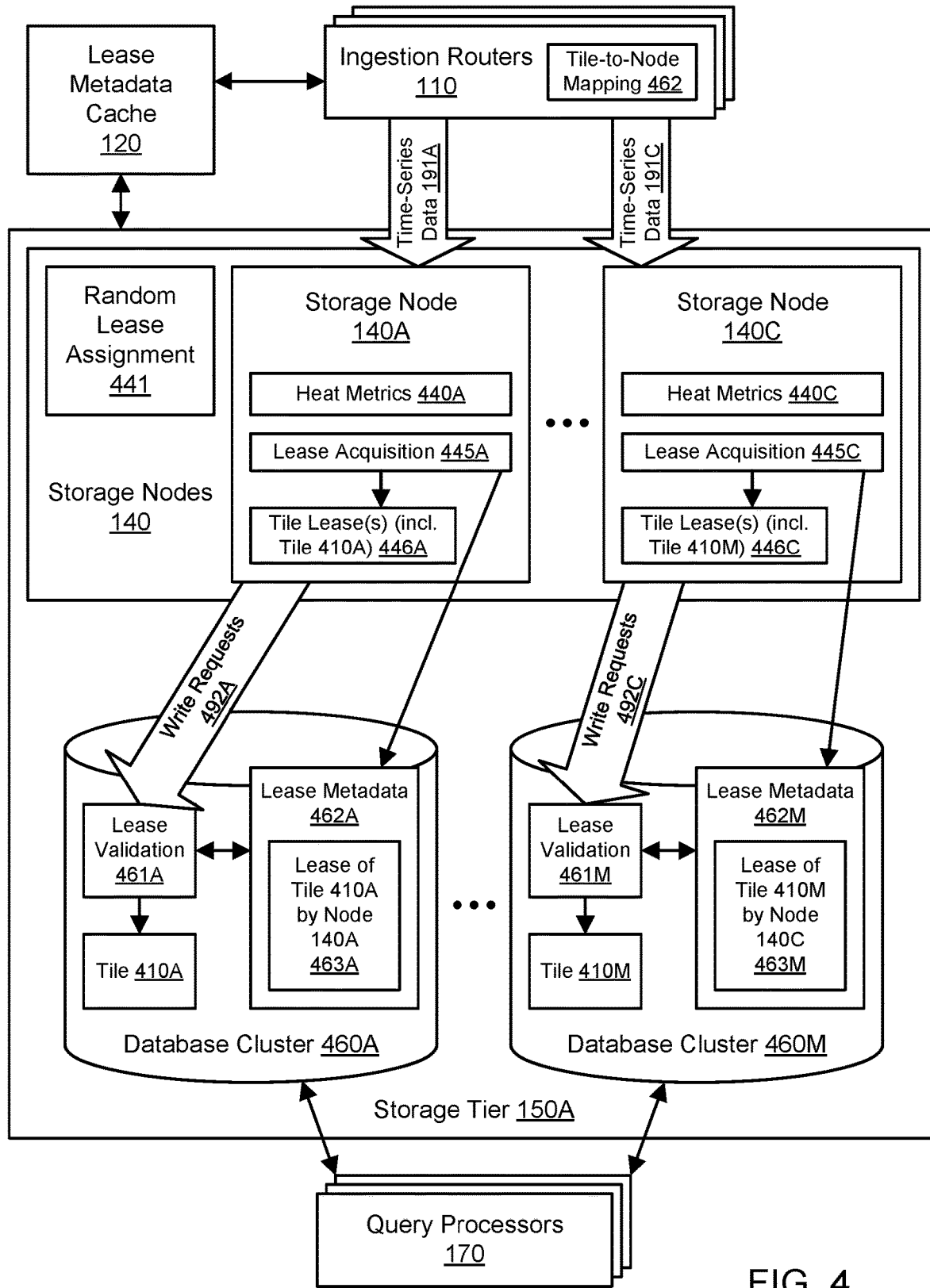
FIG. 4 illustrates an example system environment for dynamic lease assignments in a time-series database, according to some embodiments.

FIG. 4 illustrates an example system environment for dynamic lease assignments in a time-series database, according to some embodiments. Dynamic tile leases may permit the fleet of storage nodes 140 to adapt quickly to changing conditions in the time-series database 100 and may thus permit the database to offer high availability. As discussed above, a lease to a given tile in a storage tier may be assigned to one of the storage nodes. A tile lease may permit a particular storage node to write time-series data to that tile, to the exclusion of other storage nodes at a given time. A storage node may hold one or more tile leases at a given time, and the leases may be associated with tiles in one or more database clusters. In some embodiments, a lease to a particular tile may initially be assigned to a particular storage node on a random or pseudo-random basis using a component 441 for random lease assignment. For example, if one or more elements of data of a new time series are received by the ingestion routers 110, then the random lease assignment 441 may randomly select a particular storage node 140A for processing that time series. In some embodiments, the lease assignment may result from a best-of-two-random-choices approach or best-of-N-random-choices approach in which the heat at two (or N) randomly selected storage nodes is determined, and the storage node with the lowest heat is selected. In some embodiments, as shown in FIG. 4, the random lease assignment 441 may be performed by a service that manages the storage nodes 140 or by one of the storage nodes. In some embodiments, the random lease assignment 441 may be performed by the ingestion routers 110.

The storage nodes 140A-140C may include components 445A-445C for lease acquisition. Using the component 445A for lease acquisition, the storage node 140A may acquire one or more tile leases 446A, including a lease to a tile 410A in the hot storage tier 150A for storing data elements of the new time series. Similarly, using the component 445C for lease acquisition, the storage node 140C may acquire one or more tile leases 446C, including a lease to a tile 410M in the hot storage tier 150A. The tile assignment and acquisition may be performed in the data path and without introducing delays from using the control plane 180.

The storage resources (e.g., database clusters 460A-460M) of the storage tier 150A may store tile lease metadata describing aspects of tile leases. Each of the database clusters 460A-460M may include a plurality of storage nodes, servers, hosts, or other resources that combine to offer storage to clients. A location for a new tile may be selected randomly or pseudo-randomly and using analysis of heat metrics for heat balancing among the database clusters 460A-460M. In some embodiments, a placement service may select a database cluster to store a new tile based at least in part on heat or usage metrics. In some embodiments, a tile location service may report the location of a tile in a particular cluster.

As shown in the example of FIG. 4, database cluster 460A may store lease metadata 462A indicating the current owners (if any) of leases to tiles in that cluster, while database cluster 460M may store lease metadata 462M indicating the current owners (if any) of leases to tiles in that cluster. The lease metadata 462A-462M may indicate lease identifiers, storage node identifiers, and/or other information usable to approve or deny requests to write time-series data to particular tiles. In some embodiments, the lease metadata 462A-462M may include timestamps for the most recent updates to leases, e.g., to enforce time-based locks on leases to minimize lease churn. The lease acquisition components 445A-445C may update the lease metadata 462A-462M in a relevant database cluster when a particular storage node takes over a particular lease. For example, using the component 445A for lease acquisition, the storage node 140A may acquire a lease to a tile 410A in the database cluster 460A by updating the lease metadata 462A to include metadata 463A indicating that the node 140A has the lease to the tile 410A. Similarly, using the component 445C for lease acquisition, the storage node 140C may acquire a lease to a tile 410M in the database cluster 460M by updating the lease metadata 462M to include metadata 463M indicating that the node 140C has the lease to the tile 410M. Lease acquisition 445A-445C may include generating a lease identifier for a particular lease and storing the lease identifier in the corresponding database cluster. Aspects of the lease metadata 462A-462M (e.g., the assignment of particular leases to particular storage nodes) may be stored using a centralized lease metadata cache 120 to facilitate the propagation of updates among the ingestion routers 110, storage nodes 140, and database clusters 160A.

The database clusters 460A-460M may use this lease metadata 462A-462M to approve or deny requests from particular storage nodes to write time-series data to particular tiles. The storage node 140A may submit write requests 492A to write elements of time-series data 191A to the tile 410A in the database cluster 460A. Write requests 492A may be implemented as conditional writes. Using a component 461A for lease validation, the cluster 460A may validate or verify the write requests 492A and approve or permit the writes to the tile 410A because the lease metadata 462A includes an appropriate entry 463A. However, if the other storage node 140C were to submit write requests for the tile 410A without having the lease, then the cluster 460A should reject such requests based on the lease metadata 462A. Similarly, the storage node 140C may submit write requests 492C to write elements of time-series data 191C to the tile 410M in the database cluster 410M. Write requests 492C may be implemented as conditional writes. Using a component 461M for lease validation, the cluster 460M may validate or verify the write requests 492C and approve or permit the writes to the tile 410M because the lease metadata 462M includes an appropriate entry 463M. However, if the other storage node 140A were to submit write requests for the tile 410M without having the lease, then the cluster 460M should reject such requests based on the lease metadata 462M.

Ingested time-series data may be routed to storage nodes based (at least in part) on the tile leases. Tile lease metadata may be communicated to the ingestion routers 110 for routing of time-series data to appropriate storage nodes. In some embodiments, the random lease assignment component 441 may provide the tile lease metadata to the ingestion routers 110. In some embodiments, the storage nodes 140 themselves may provide the tile lease metadata to the ingestion routers 110. In some embodiments, the storage nodes 140 may update the lease metadata cache 120 with new or modified tile lease metadata, and the ingestion routers 110 may acquire updates from the cache. As discussed above, a given tile may be defined by spatial boundaries that define a spatial range and by temporal boundaries that define a temporal range. Based (at least in part) on the tile lease metadata, the ingestion routers 110 may maintain a tile-to-node mapping 462 that maps particular spatial ranges (and potentially temporal ranges) to particular storage nodes (nodes) according to current tile leases. For example, using the tile-to-node mapping 462, the ingestion routers 110 may route time-series data 191A to storage node 140A and time-series data 191C to storage node 140C. Individual storage nodes may provide lease updates to ingestion routers 110 for updating the tile-to-node mapping 462. For example, if storage node 140A is informed by cluster 460A that storage node 140C now has the lease to tile 410A, then the storage node 140A may pass this information on to the ingestion routers 110 so that proper routing of ingested time-series data is not delayed.

The storage nodes 140A-140C may maintain local usage metrics such as heat metrics 440A-440C that indicate a throughput of time-series data or some other rate of receiving, writing, or otherwise processing time-series data at a particular storage node. In some embodiments, the heat metrics may indicate CPU metrics for the last N minutes. In some embodiments, a randomly chosen storage node 140A may reject an initial lease assignment, e.g., if its heat metrics 440A exceed a threshold value. As discussed above, tile leases may be assigned initially to storage nodes on a random or pseudo-random basis so that ingestion can begin without delay. However, a refinement mechanism may be used to assign or reassign leases for heat balancing across the fleet of storage nodes. The refinement mechanism may use the heat metrics 440A-440C to select storage nodes with lower heat (e.g., lower throughput per time period) so that the heat can be distributed across the fleet of storage nodes 140. In some embodiments, a candidate set of two (or more) other storage nodes may be identified on a random or pseudo-random basis for assigning or reassigning a lease, and the storage node with the lowest heat (or superior usage metrics) may be selected for taking on the tile lease.

In some embodiments, a storage node may acquire a lease held by another storage node. In some embodiments, any storage node may be eligible to take over any lease. For example, the storage node 140A may become unreachable or unavailable, e.g., due to a failure or due to being network partitioned. Under these circumstances, to maintain high availability for writing new elements of time-series data, another storage node 140C may perform lease acquisition 445C for the tile 410A. As discussed above, the storage node 140C may update the lease metadata 462A at the database cluster 460A to indicate its current ownership of the lease to the tile 410A. The cluster 460A may then begin validating write requests to the tile 410A from the storage node 140C. Under these circumstances, however, the storage node 140A may come back online and resume sending the write requests 492A to the tile 410A. These write requests 492A may be rejected by the cluster 460A based on the updated lease metadata. The cluster 460A may send the storage node 140A responses that indicate that the other storage node 140C now has the lease. After the storage node 140A is informed of these rejections, the storage node 140A may pass on the updated lease information to the ingestion routers 110, e.g., using the lease metadata cache 120 as an intermediate component.

A service resident on the storage nodes 140 may offer an application programming interface (API) that assigns a node for a tile, e.g., as part of a random lease assignment component 441 as implemented by a first storage node. The API may take as input the tile identifier and cluster location. When invoked, the API may connect to the specified cluster and read its tile lease metadata. If the lease doesn't have an owner, the API may trigger an assignment using best-of-two (or best-of-N) heuristics. Assuming the first node was selected at random, the first node may pick another random node (in a healthy state) and fetch its heat statistics. If the local heat at the first node is less than the second node, the first node may acquire the lease in the database cluster. If the second node has lower heat, the first node may invoke a lease acquisition API (with the current lease state as input) on the second node to ask it to take over the lease. However, if the lease already has an owner, the lease assignment API may return the owner information as the API response. Lease acquisition on the database cluster may be implemented as a conditional write in case some other node has acquired the lease concurrently. Any conditional write violation should respect the new lease information to back-off, thereby avoiding lease churn.

In some embodiments, leases may be acquired by other storage nodes only after a time-based lock has expired. In some embodiments, the lease metadata 462A-462M may include timestamps for the most recent updates to leases. Using these timestamps, the storage nodes 140A-140C and/or clusters 460A-460M may enforce time-based locks on leases to minimize lease churn. For example, a lease may be permitted to change ownership only after five seconds. In some embodiments, lease reassignments may be rejected or delayed according to these time-based locks. By enforcing time-based locks, the database 100 may prevent a situation where a lease to a particular tile is rapidly cycling between two storage nodes.

The time-series database 100 may enable lease acquisition for failure scenarios. Failure scenarios may include planned failures such as deployments (e.g., graceful process shutdown), scenarios in which the ingestion routers 110 are able to talk to the storage node but the tile was deleted from the database cluster (e.g., expiry/splits/merges), and scenarios in which the ingestion routers 110 are able to talk to the storage node but the node is not hosting the lease anymore. For graceful shutdown scenarios like deployments, nodes may shed leases by determining another node to acquire a lease. For expiry/splits/merges, the tile metadata may be stale, and a tile location service may be required to refresh its tile metadata or else fail requests from the ingestion routers 110. For other scenarios, retries may be attempted on request failures.

Failure scenarios may include unplanned failures such process crashes, virtual compute instance issues, network partitions, and so on. During such unplanned failures, ingestion routers 110 may not be able to talk to a failed storage node or may be able to talk with requests failing due to errors. The API that assigns a node for a tile may permit additional "hints" in its input to handle certain failure conditions. Such hints may be forwarded from ingestion routers to storage nodes. The nodes may then verify the hints by reading lease metadata from the database clusters. If the provided information matches the lease metadata in the clusters, then the node may check the lease acquisition time. No lease change may occur if the lease acquisition time is within a predetermined duration, e.g., five seconds. If the provided information does not match or has an outdated version number (which is incremented on every update), then the lease metadata may be returned to the tile location service. In some embodiments, the health of a storage node may be determined, e.g., by analyzing the node's insert activity if the node is unreachable. If a node is deemed unhealthy, another node may take over the lease.

Figure 5:
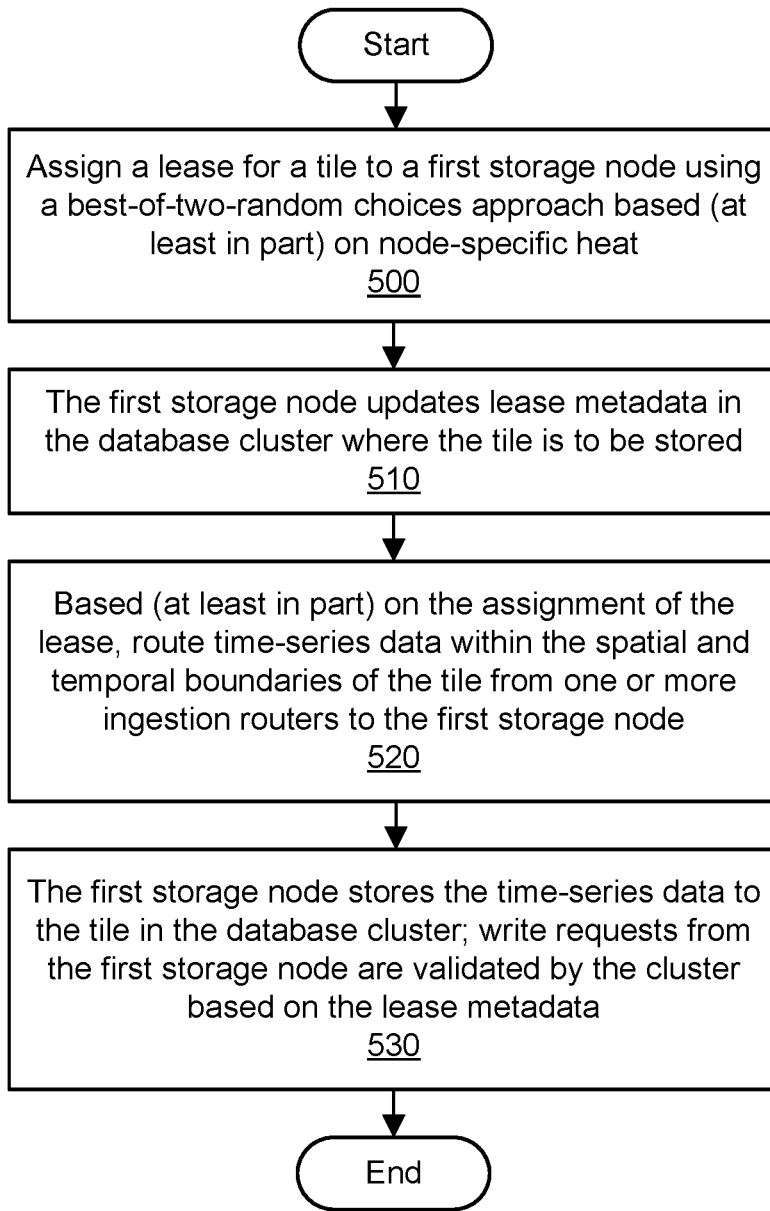
FIG. 5 is a flowchart illustrating a method for dynamic lease assignments in a time-series database, according to some embodiments.

FIG. 5 is a flowchart illustrating a method for dynamic lease assignments in a time-series database, according to some embodiments. As shown in 500, a lease for a tile may be assigned initially to a first storage node. The lease assignment may result from a best-of-two-random-choices approach or best-of-N-random-choices approach in which the heat at two (or N) randomly selected storage nodes is determined, and the storage node with the lowest heat is selected. Individual storage nodes may maintain heat metrics that indicate a throughput of time-series data or some other rate of receiving, writing, or otherwise processing time-series data at a particular storage node. The tile assignment may be performed in the data path and without using the control plane.

As shown in 510, to acquire the lease to the tile, the first storage node may update the tile lease metadata in the database cluster where the tile is stored. In some embodiments, the location of the tile (e.g., the selection of the particular database cluster) may also be made on a random or pseudo-random basis with additional heat balancing. The lease metadata 2M may indicate lease identifiers, storage node identifiers, and/or other information usable to approve or deny requests to write time-series data to particular tiles. In some embodiments, the lease metadata may include timestamps for the most recent updates to leases, e.g., to enforce time-based locks on leases to minimize lease churn.

As shown in 520, based (at least in part) on the assignment of the lease, elements of time-series data within the spatial and temporal boundaries of the tile may be routed (e.g., by one or more ingestion routers) to the first storage node. As discussed above, a given tile may be defined by spatial boundaries that define a spatial range and by temporal boundaries that define a temporal range. Based (at least in part) on the tile lease metadata, the ingestion routers may maintain a tile-to-node mapping that maps particular spatial ranges (and potentially temporal ranges) to particular storage nodes (nodes) according to current tile leases. Tile lease metadata may be communicated to the ingestion routers for routing of time-series data to appropriate storage nodes. In some embodiments, the storage nodes themselves may provide the tile lease metadata to the ingestion routers.

As shown in 530, the first storage node may store the time-series data to the tile in the database cluster. The database cluster may use the tile lease metadata to approve or deny requests from particular storage nodes to write time-series data to particular tiles. Write requests from the first storage node to the tile may be validated by the cluster using the tile lease metadata that indicates that the first storage node has the lease to the tile. Write requests from other storage nodes to the tile may be rejected as long as the same tile lease metadata is used for validation.

Figure 6:
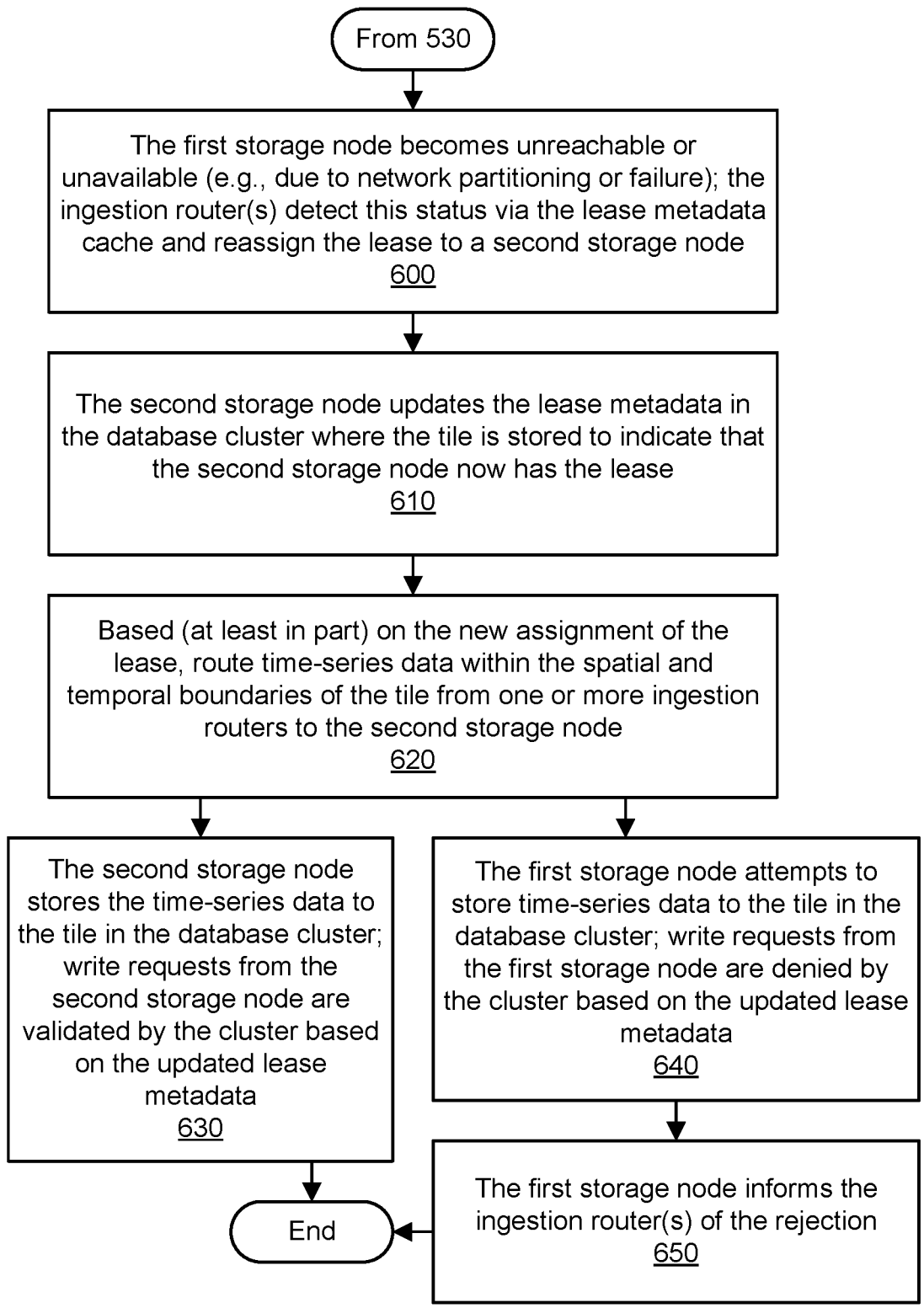
FIG. 6 is a flowchart illustrating a method for forced lease acquisition in a time-series database, according to some embodiments.

FIG. 6 is a flowchart illustrating a method for forced lease acquisition in a time-series database, according to some embodiments. One or more of the operations shown in FIG. 6 may be performed after the operation shown in 530. As shown in 600, the first storage node may become unreachable or unavailable, e.g., due to a failure or due to network partitioning. In some embodiments, when the first storage node fails to process incoming time-series data, a failure detection component of the time-series database such as one or more ingestion routers or the lease metadata cache may detect the failure status and ask another storage node to take over the tile lease. In some embodiments, the lease metadata cache may periodically check the status of storage nodes, e.g., to determine whether the nodes are reachable and responding. In some embodiments, the ingestion router(s) may talk to the lease metadata cache to determine the status of the first storage node and may initiate lease reassignment if the first storage node has failed a status check. As shown in 610, a second storage node may perform lease acquisition for the tile by updating the lease metadata at the database cluster to indicate that the second storage node has the lease to the tile. However, the first storage node may be unaware of this change to the tile lease.

As shown in 620, based (at least in part) on the new assignment of the lease, elements of time-series data within the spatial and temporal boundaries of the tile may be routed (e.g., by one or more ingestion routers) to the second storage node. As discussed above, a given tile may be defined by spatial boundaries that define a spatial range and by temporal boundaries that define a temporal range. Based (at least in part) on the tile lease metadata, the ingestion routers may maintain a tile-to-node mapping that maps particular spatial ranges (and potentially temporal ranges) to particular storage nodes (nodes) according to current tile leases. Tile lease metadata may be communicated to the ingestion routers for routing of time-series data to appropriate storage nodes. In some embodiments, the storage nodes themselves may provide the tile lease metadata to the ingestion routers.

As shown in 630, the second storage node may store the time-series data to the tile in the database cluster. The database cluster may use the tile lease metadata to approve or deny requests from particular storage nodes to write time-series data to particular tiles. Write requests from the second storage node to the tile may be validated by the cluster using the tile lease metadata that indicates that the second storage node has the lease to the tile.

As shown in 640, the first storage node may come back online and ay attempt to store time-series data to the tile in the database cluster. Write requests from the first storage node to the tile may be denied by the cluster using the tile lease metadata that indicates that the second storage node has the lease to the tile. The cluster may send the first storage node responses that indicate that the second storage node now has the lease. As shown in 650, the first storage node may inform the ingestion router(s) of the new lease assignment so that ingestion and storage of new time-series data is not delayed. In some embodiments, the first storage node may update the lease metadata cache, and the ingestion router(s) may use these updates.

Figure 7:
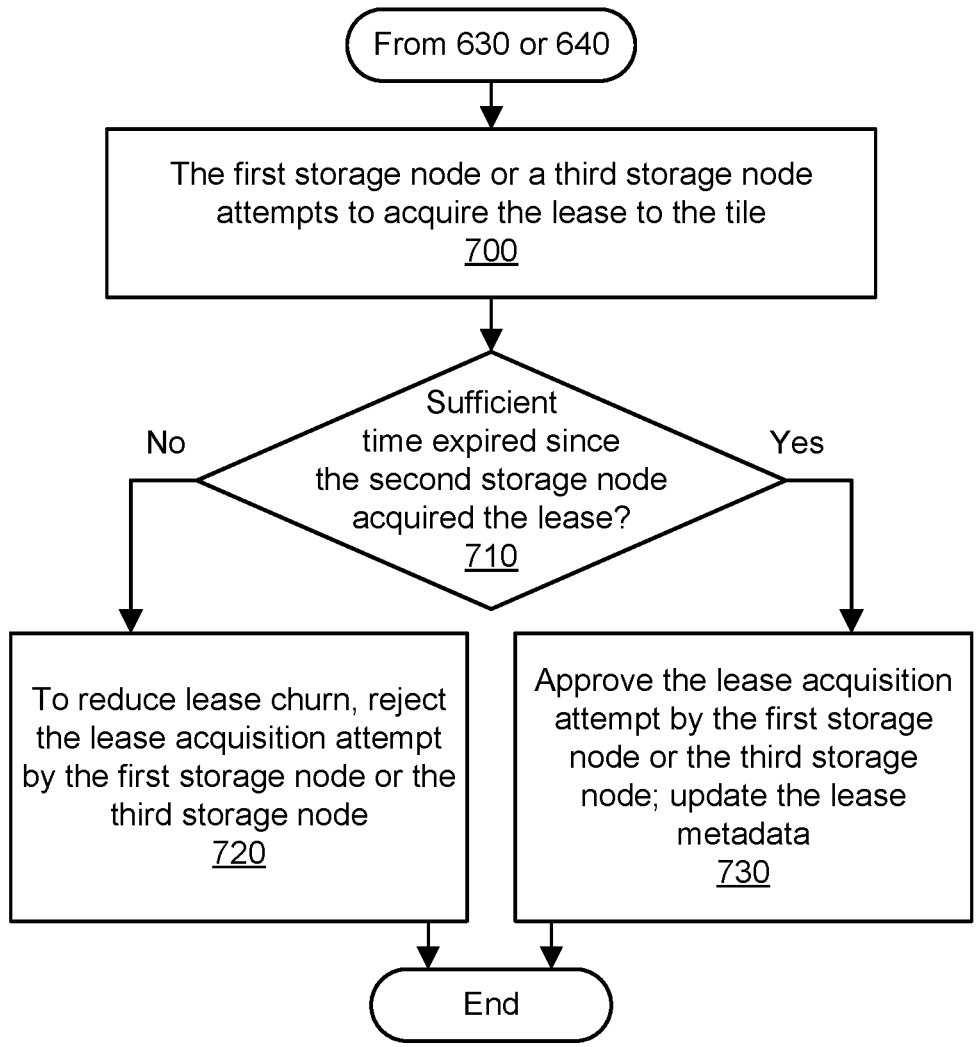
FIG. 7 is a flowchart illustrating a method for delaying lease acquisition to reduce lease churn in a time-series database, according to some embodiments.

FIG. 7 is a flowchart illustrating a method for delaying lease acquisition to reduce lease churn in a time-series database, according to some embodiments. One or more of the operations shown in FIG. 7 may be performed after the operations shown in 630 or 640. As shown in 700, the first storage node or a third storage node may attempt to perform lease acquisition for the tile, e.g., by attempting to updating the lease metadata at the database cluster. In some embodiments, the lease metadata may include timestamps for the most recent updates to leases. Using these timestamps, the storage nodes and/or clusters may enforce time-based locks on leases to minimize lease churn. As shown in 710, the method may determine whether sufficient time has expired since the second storage node has acquired the lease. For example, the first storage node or the database cluster may compare the time at which the second storage node acquired the lease to the current time. Leases may be maintained for at least a predetermined duration, e.g., five seconds.

As shown in 720, if sufficient time (e.g., five seconds) has not expired, then to reduce lease churn, the method may reject or delay the lease acquisition attempt by the first storage node or the third storage node. In some embodiments, the first storage node or the third storage node may perform this rejection or delay after receiving the tile lease metadata from the cluster and performing the comparison shown in 710. In some embodiments, the database cluster may perform this rejection or delay after examining the tile lease metadata and performing the comparison shown in 710. As shown in 730, if sufficient time (e.g., five seconds) has indeed expired, then the method may approve the lease acquisition attempt by the first storage node or the third storage node. The lease metadata in the cluster may be updated to indicate that the first storage node or the third storage node now owns the lease, and the timestamp may also be updated. By enforcing time-based locks for lease acquisition, the time-series database may prevent a situation where a lease to a particular tile is rapidly cycling between two storage nodes.

Splitting Partitions Across Clusters in a Time-Series Database

Figure 8A:
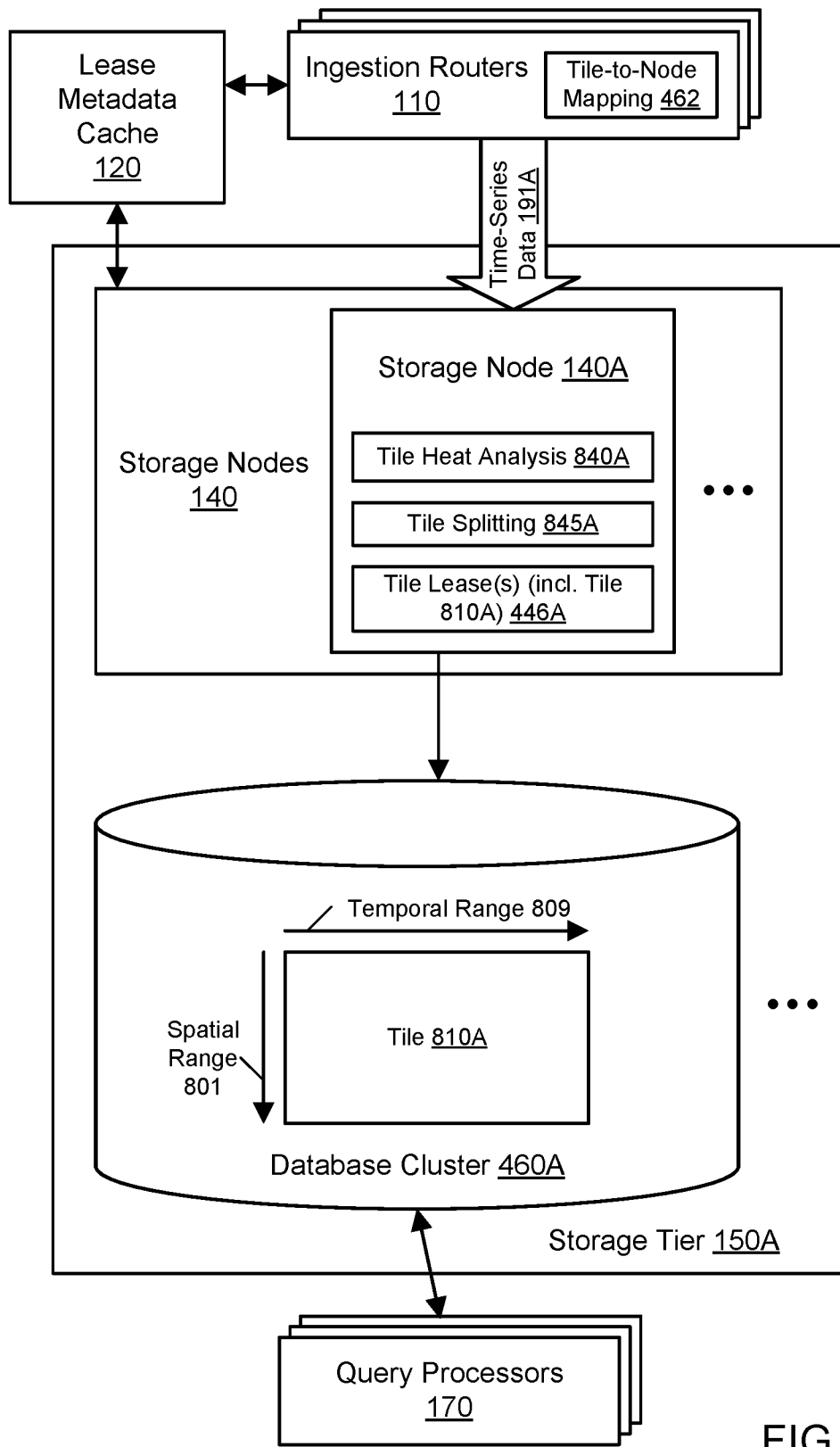
FIGS. 8A, 8B, 8C, and 8D illustrate an example system environment for splitting partitions across clusters in a time-series database, according to some embodiments.

FIGS. 8A, 8B, 8C, and 8D illustrate an example system environment for splitting partitions across clusters in a time-series database, according to some embodiments. The time-series database 100 may performs splits of tiles such that data movement (e.g., from one database cluster to another) is minimized while high availability for writes and queries is maintained. As shown in FIG. 8A, a storage node 140A may include a component 840A for tile heat analysis. The tile heat analysis may analyze metrics for the heat for individual tiles, such as tile 810A in database cluster 460A, whose leases 446A are held by the storage node 140A. The heat for a tile may represent the throughput of data written to the tile or some other usage metric or rate. If the heat for a particular tile 810A exceeds a heat threshold (e.g., a particular throughput or other usage over the past N minutes), then the node 140A may decide to split the tile to maintain high availability for writes of newly ingested time-series data. A component 845A may implement the tile splitting in a manner that minimizes data movement from database cluster to database cluster. The tile 810A may have temporal boundaries representing a particular temporal range 809 and spatial boundaries representing a particular spatial range 801. In some embodiments, the temporal range may extend indefinitely into the future. As will be discussed below, the tile splitting 845A may first perform a temporal split and then a spatial split to minimize data movement while maintaining high availability.

Figure 8B:
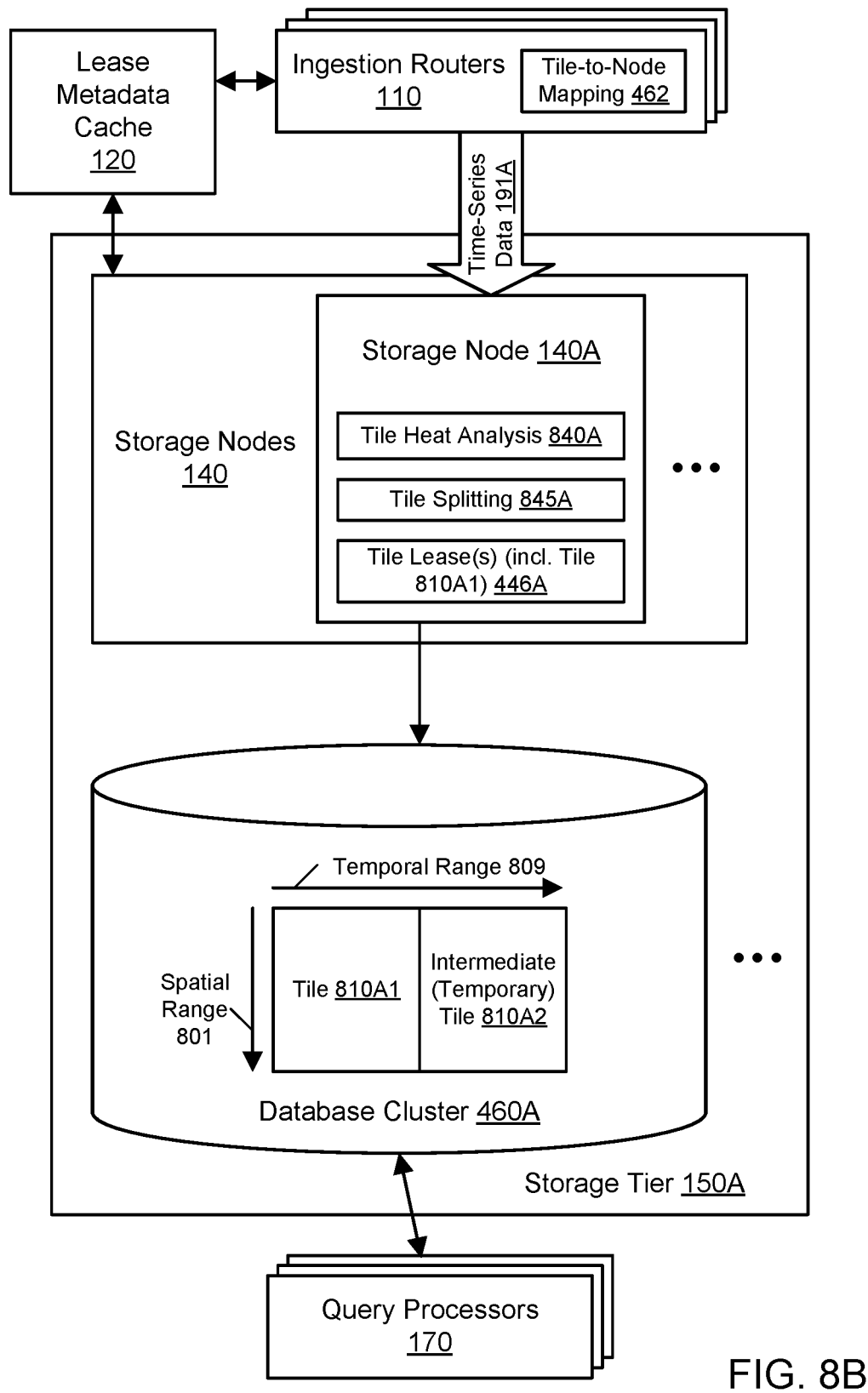

As shown in FIG. 8B, the original tile 810A may be split temporally. The temporal split may result in an intermediate tile 810A2 having the original spatial boundaries but a later portion of the original temporal boundaries. The tile 810A2 may be considered temporary. No data may be written to the intermediate tile 810A2, and in some embodiments, no tile metadata may be created for the intermediate tile. The temporal split may also result in a tile 810A1 having the original spatial boundaries but an earlier portion of the original temporal boundaries. The tile 810A1 may represent a modified version of the original tile 810A, e.g., by storing the tile and its contents in the original location but with modified tile metadata. The temporal split point may be selected at a time at or after the current time. The temporal split point may be selected at a time after the latest timestamp of any time-series data already written to the original tile 810A. By generating the intermediate tile 810A2 with temporal boundaries in the future, the corresponding data set may be empty at the time of the temporal split. The tile 810A1 may remain in its current location in the database cluster 460A such that none of its contents need to be moved. Additionally, the tile 810A1 may continue to receive some time-series data, depending on when the temporal split point is selected. In some embodiments, the storage node 140A may acquire leases to the tile 810A1, but no lease need be acquired for intermediate tile 810A2 because it is a temporary element. The tile splitting may include adding indirection pointers from the original tile to newly created tiles and from the newly created tiles to the original tile.

Figure 8C:
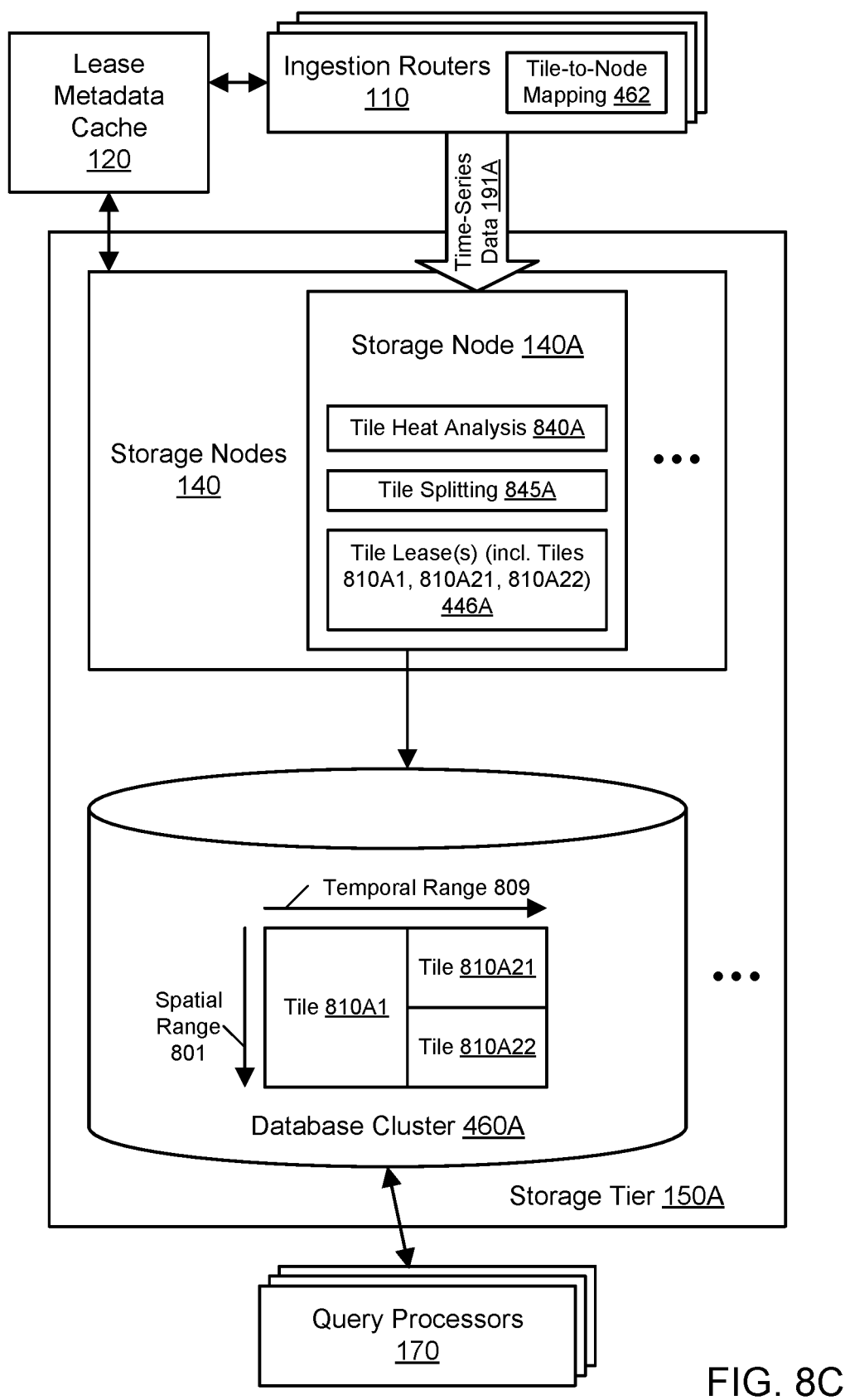

As shown in FIG. 8C, the intermediate tile 810A2 may then be split spatially to generate two new tiles 810A21 and 810A22. The temporal split and spatial split may be performed as a two-stage but atomic operation such that no tile metadata is created for the intermediate and temporary tile 810A2. The new tile 810A21 may represent a first portion of the original spatial boundaries 801 along with the same temporal boundaries as the intermediate tile 810A2. Similarly, the new tile 810A22 may represent a second portion of the original spatial boundaries 801 along with the same temporal boundaries as the intermediate tile 810A2. The spatial range may be divided among the new tiles 810A21 and 810A22 on any suitable basis, e.g., to divide the heat as evenly as possible. The spatial range of the new tile 810A21 may include a contiguous series of keys, and the spatial range of the new tile 810A22 may also include a contiguous series of keys. The respective spatial ranges of the new tiles 810A21 and 810A22 may be non-overlapping. In some embodiments, the storage node 140A may acquire leases to the tiles 810A21 and 810A22.

The tile splitting may include adding indirection pointers from the original tile to newly created tiles and from the newly created tiles to the original tile. In some embodiments, the storage node 140A may perform double writes such that all traffic to tile 810A that falls within the boundaries of tile 810A22 is written to tile 810A22 also. Time-series data may be backfilled from tile 810A to tiles 810A21 and 810A22 for the overlapping range. Once the backfill is complete, the storage node 140A may stop processing new ingestion requests for tile 810A, may drain all inflight ingestion requests, may mark the tile 810A as split in the database cluster with forwarding metadata installed (indirection pointers), and may start rejecting new writes with a forwarding address of tile 810A21 or tile 810A22. The query processors 170 may continue to direct queries to appropriate ones of the tiles 810A1, 810A21, and 810A22 using predicates (logical filters) such that no disruption to query processing is expected from the tile splitting 845A.

Figure 8D:
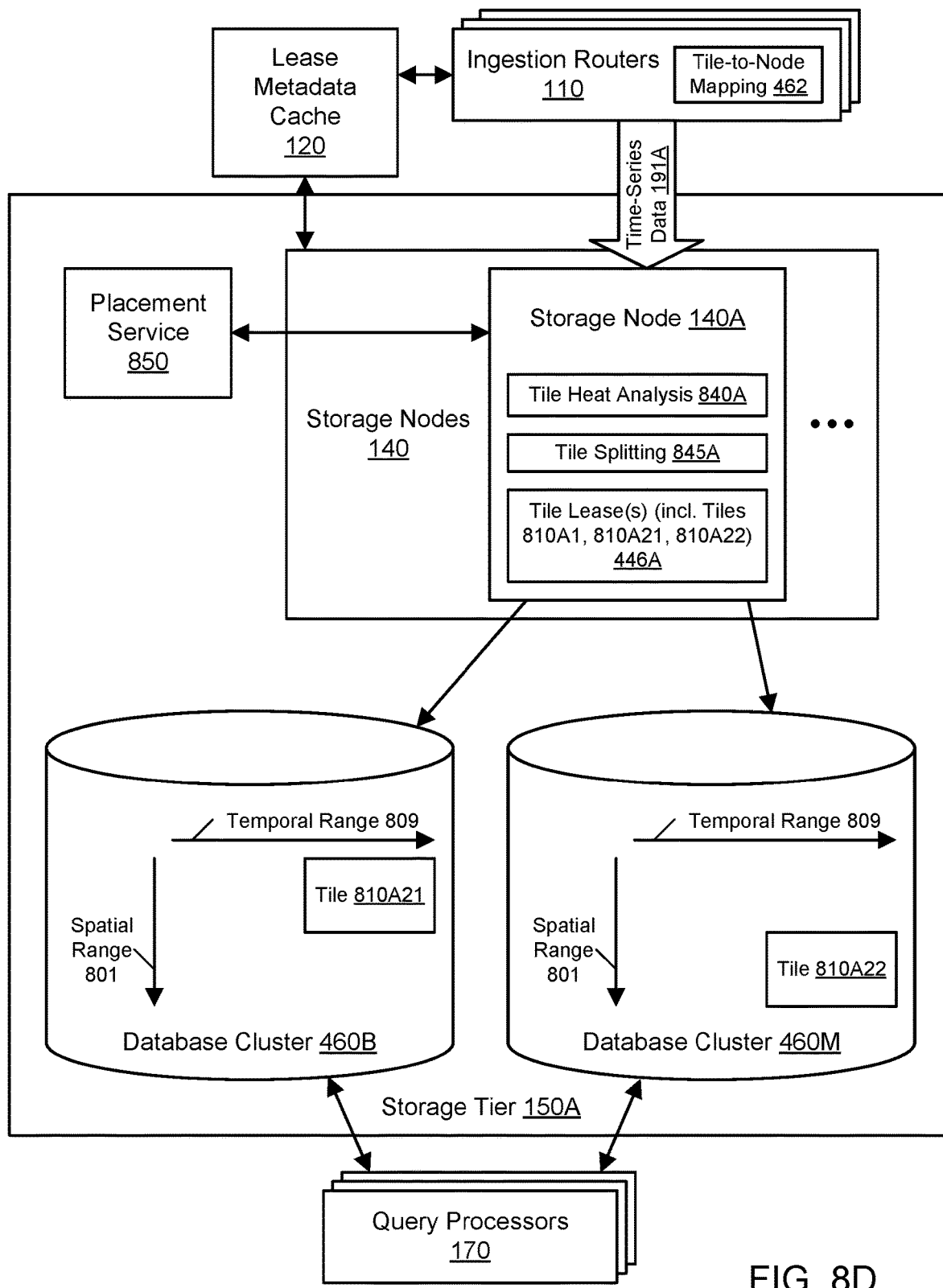

In some embodiments, both of the new tiles 810A21 and 810A22 may be stored on the same database cluster 460A as the original tile 810A. However, one or more of the new tiles 810A21 and 810A22 may be moved to another database cluster. Because the temporal boundaries of the tiles 810A21 and 810A22 are in the future, no data movement need be performed to relocate one of these tiles to a different cluster. As shown in FIG. 8D, one of the tiles 810A21 may be located on another cluster 460B, while another of the tiles 810A22 may be located on yet another cluster 460M. One or more of the tiles 810A21 and 810A22 may be moved from the original cluster 460A for heat balancing purposes. In some embodiments, the storage node 140A may interact with a placement service 850 to determine particular database clusters for the tiles 810A21 and/or 810A22. The placement service 850 may track the heat metrics for the database clusters 460A-460M and perform analysis of such usage metrics to make placement decisions for tiles.

The time-series database 100 may also perform tile splitting 845A and/or tile moves for tiles that are not empty, e.g., whose temporal boundaries are in the past. For example, delivery of time-series data within the boundaries of an older tile may have been delayed due to network issues, and the time-series data may arrive after the temporal boundaries of the tile have closed. If the heat for such a tile exceeds a threshold, the tile may be split spatially. The spatial split may generate two new tiles: a tile representing a first portion of the original spatial boundaries and the original temporal boundaries, and a tile representing a second portion of the original spatial boundaries and the original temporal boundaries. Tile splitting and tile moving may include adding indirection pointers from the original tile to newly created tiles and from the newly created tiles to the original tile. The new tiles may be distributed across different database clusters for heat balancing. However, at least one of the tiles may be maintained on the original database cluster to minimize data movement.

Figure 9A:
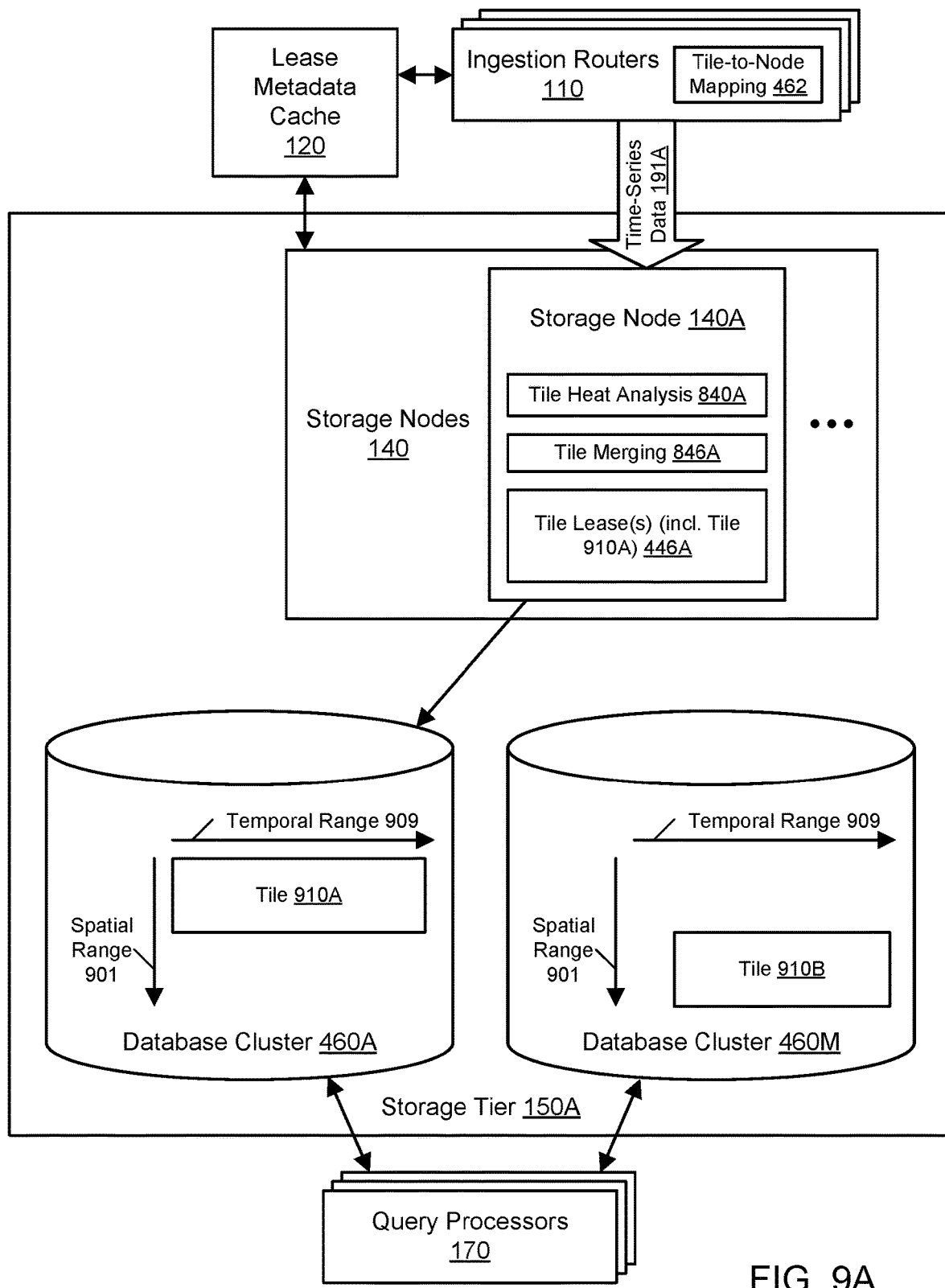
FIGS. 9A, 9B, and 9C illustrate an example system environment for merging partitions across clusters in a time-series database, according to some embodiments.
Figure 9B:
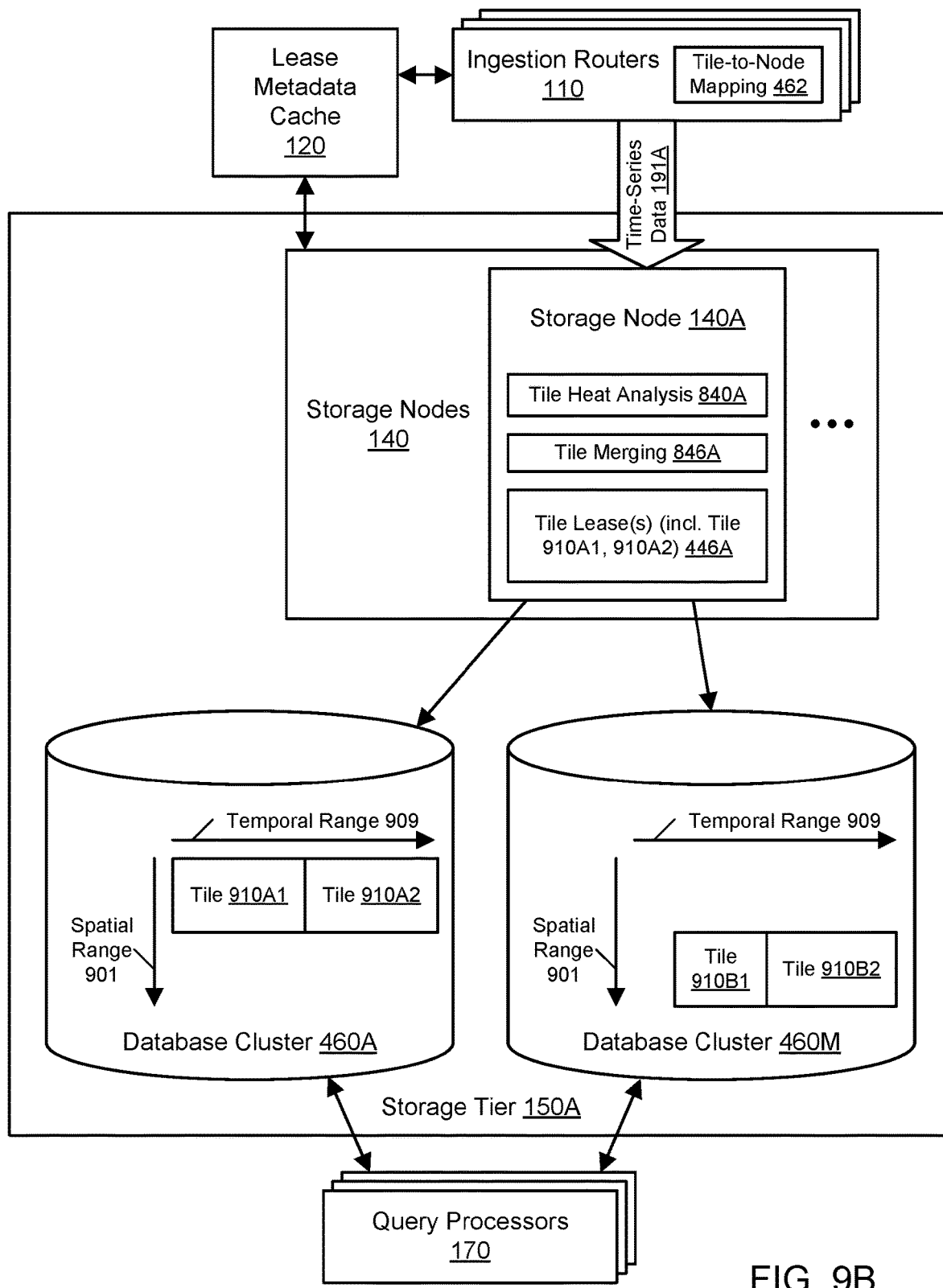
Figure 9C:
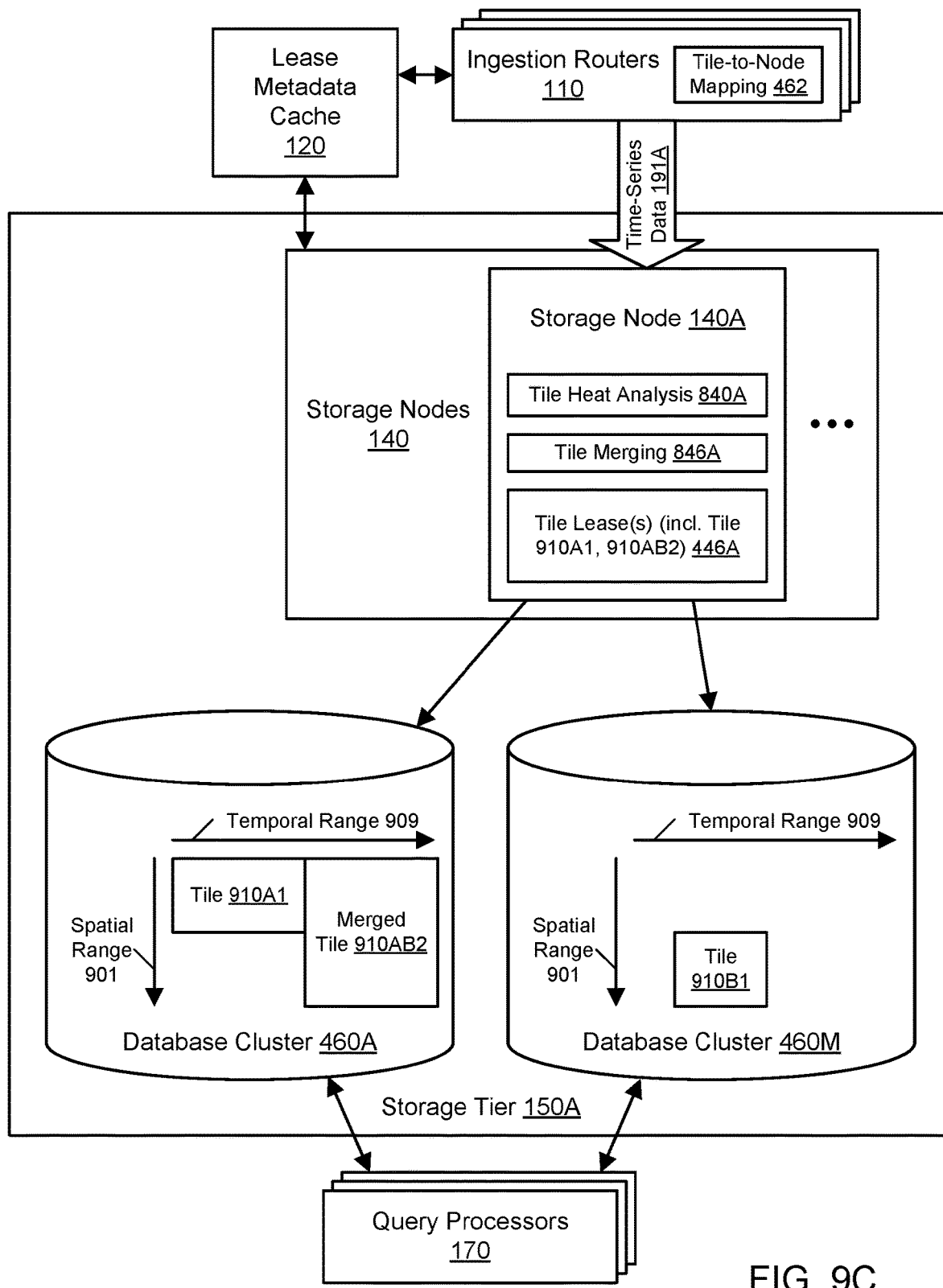

FIGS. 9A, 9B, and 9C illustrate an example system environment for merging partitions across clusters in a time-series database, according to some embodiments. The time-series database 100 may perform merges of tiles such that data movement (e.g., from one database cluster to another) is minimized while high availability for writes and queries is maintained. As shown in FIG. 9A, a storage node 140A may include a component 840A for tile heat analysis. The tile heat analysis may analyze metrics for the heat for individual tiles, such as tile 910A in database cluster 460A, whose leases 446A are held by the storage node 140A. The heat for a tile may represent the throughput of data written to the tile or some other usage metric or rate. If the heat for a particular tile 910A falls below a heat threshold (e.g., a particular throughput or other usage over the past N minutes), then the node 140A may decide to merge the tile to maintain efficient use of resources of the time-series database 100. A component 846A may implement the tile merging in a manner that minimizes data movement from database cluster to database cluster. The tile 910A may have temporal boundaries representing a particular temporal range 909 and spatial boundaries representing a portion of a particular spatial range 901.

As part of the tile merging 846A, the storage node 140A may find another tile whose heat is also beneath the threshold. The other tile may have the same temporal range as the tile 910A or, as shown in FIG. 9A, may have a different temporal range. The other tile may have an adjacent spatial range, such that the union of the two spatial ranges would not leave any gaps to be filled by other tiles. The storage node 140A may identify such a tile by referring to an index of tiles according to their spatial boundaries, e.g., as maintained by a tile location service. In some embodiments, the storage node 140A may identify the two tiles on either end of the spatial range of the tile 910A and select the neighboring tile with the lower heat for the merge. As shown in the example of FIG. 9A, the tile 910B may represent such a tile with low heat and an adjacent spatial range. The other tile 910B may be located on a different cluster (as shown in FIG. 9A) or on the same cluster. In some embodiments, the lease to the other tile 910B may already be held by the storage node 140A. In some embodiments, the storage node 140A may acquire the lease to the other tile 910B by asking the other storage node to shed the lease. As will be discussed below, the tile merging 846A may first perform a temporal split of both tiles 910A and 910B and then a spatial merge.

As shown in FIG. 9B, the tiles 910A and 910B may be split temporally such that the resulting later tiles are time-aligned. The temporal split of tile 910A may result in a tile 910A2 having the original spatial boundaries as tile 910A but a later portion of the original temporal boundaries. The temporal split may also result in a tile 910A1 having the original spatial boundaries but an earlier portion of the original temporal boundaries. The tile 910A1 may represent a modified version of the original tile 910A, e.g., by storing the tile and its contents in the original location but with modified tile metadata. The temporal split point may be selected at a time at or after the current time. The temporal split point may be selected at a time after the latest timestamp of any time-series data already written to the original tile 910A. By generating the second tile 910A2 with temporal boundaries in the future, this tile may be empty at the time of the temporal split. The tile 910A1 may remain in its current location in the database cluster 460A such that none of its contents need to be moved. Additionally, the tile 910A1 may continue to receive some time-series data, depending on when the temporal split point is selected. In some embodiments, the storage node 140A may acquire leases to the tiles 910A1 and 910A2.

The temporal split of tile 910B may result in a tile 910B2 having the original spatial boundaries as tile 910B but a later portion of the original temporal boundaries. The temporal split may also result in a tile 910B1 having the original spatial boundaries but an earlier portion of the original temporal boundaries. The tile 910B1 may represent a modified version of the original tile 910B, e.g., by storing the tile and its contents in the original location but with modified tile metadata. The temporal split point for tile 910B may be selected as the same point in time as the split for tile 910A.

By generating the second tile 910B2 with temporal boundaries in the future, this tile may be empty at the time of the temporal split. By performing time alignment, the tiles 910A2 and 910B2 may share the same temporal range even though the "parent" tiles 910A and 910B did not share the same temporal range. The tile 910B1 may remain in its current location in the database cluster 460M such that none of its contents need to be moved. Additionally, the tile 910B1 may continue to receive some time-series data, depending on when the temporal split point is selected. In some embodiments, the storage node 140A may acquire leases to the tiles 910B1 and 910B2.

As shown in FIG. 9C, the new tiles 910A2 and 910B2 may then be merged spatially to generate a merged tile 910AB2. The merged tile 910AB2 may be created on the same cluster as the tile 910A2. The merged tile 910AB2 may represent a union of the spatial boundaries of the tiles 910A2 and 910B2 along with the same temporal boundaries as the tiles 910A2 and 910B2. The spatial range of the new tile 910AB2 may include a contiguous series of keys with no gaps to be filled by other tiles. In some embodiments, the storage node 140A may acquire a lease to the tile 910AB2. As data is written to the new tile 910AB2 in the future, the new tile 910AB2 may have a heat approximating the combination of the heat of tile 910A and the heat of tile 910B. In some embodiments, the storage node 140A may perform double writes such that all traffic to tiles 910A2 and 910B2 is written to tile 910AB2 also. Time-series data may be backfilled from tile 910B2 to tile 910AB2. In some embodiments, in-memory traffic may be stopped and drained before completing the merge, and forwarding metadata (indirection pointers) may be installed on tile 910A2 and tile 910B2 to forward traffic to tile 910AB2. By consolidating time-series data in this manner, the storage resources and processing resources of the time-series database 100 may be used more efficiently. The query processors 170 may continue to direct queries to appropriate ones of the tiles 910A1, 910B1, and 910AB2 using predicates (logical filters) such that no disruption to query processing is expected from the tile merging 846A.

Figure 10:
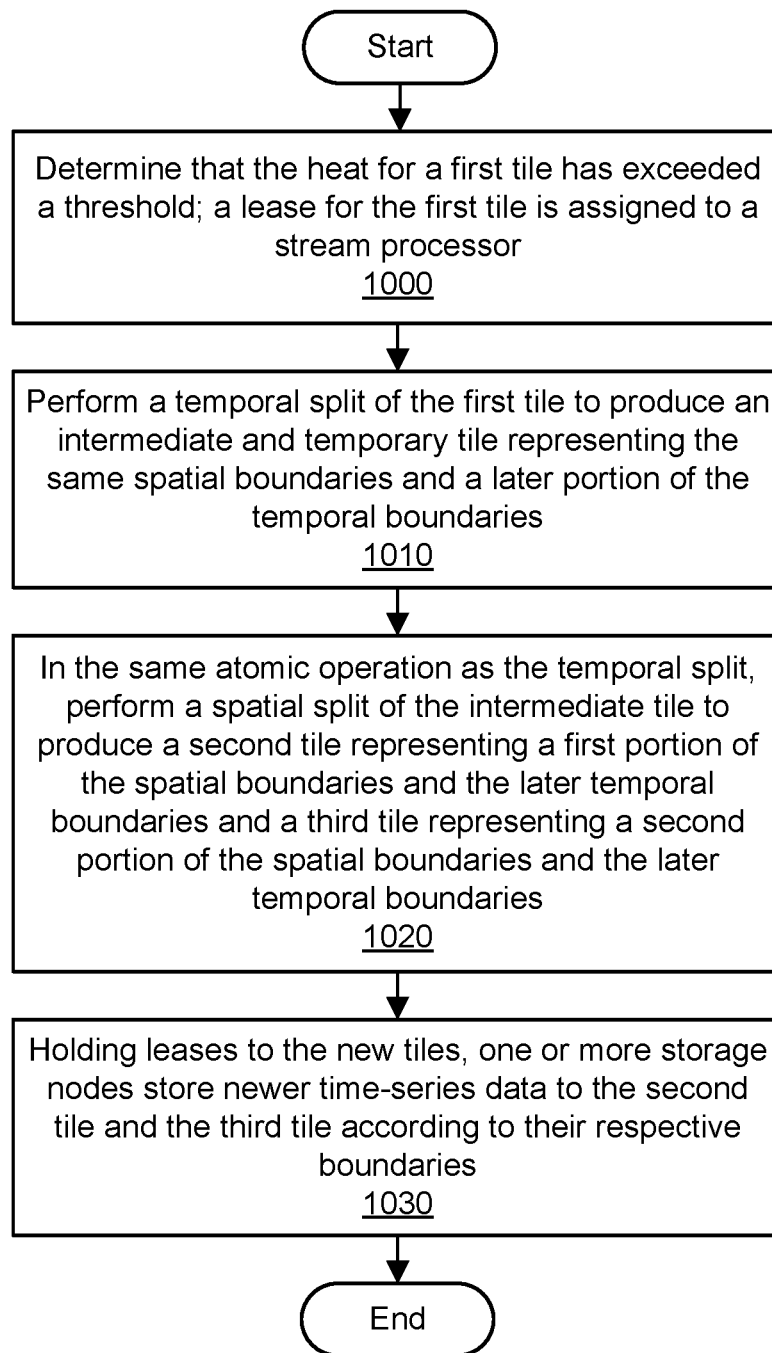
FIG. 10 is a flowchart illustrating a method for splitting partitions across clusters in a time-series database, according to some embodiments.

FIG. 10 is a flowchart illustrating a method for splitting partitions across clusters in a time-series database, according to some embodiments. A storage node may monitor the heat for tiles for which it holds leases, such as a first tile. The heat for the first tile may represent the throughput of data written to the tile or some other usage metric or rate. The first tile may have spatial boundaries defining a spatial range and temporal boundaries defining a temporal range. As shown in 1000, the method may determine that the heat for the first tile exceeds a heat threshold (e.g., a particular throughput or other usage over the past N minutes). In some embodiments, a storage node with the lease to the tile may perform the heat analysis and decide to split the tile to maintain high availability for writes of newly ingested time-series data.

As shown in 1010, the method (e.g., the storage node) may perform a temporal split of the first tile. The temporal split may result in an intermediate and temporary tile having the original spatial boundaries but a later portion of the original temporal boundaries. The temporal split may also result in a modified first tile having the original spatial boundaries but an earlier portion of the original temporal boundaries. The temporal split point may be selected at a time at or after the current time. The temporal split point may be selected at a time after the latest timestamp of any time-series data already written to the first tile. By generating the intermediate tile with temporal boundaries in the future, this tile may be empty at the time of the temporal split. The modified first tile may remain in its current location in a database cluster such that none of its contents need to be moved. Additionally, the modified original tile may continue to receive some time-series data, depending on when the temporal split point is selected. In some embodiments, the storage node may acquire leases to the modified first tile.

As shown in 1020, the method (e.g., the storage node) may perform a spatial split of the intermediate tile. The spatial split may produce a second tile representing a first portion of the original spatial boundaries along with the same (later) temporal boundaries as the second tile. The spatial split may also produce a third tile representing a second portion of the original spatial boundaries along with the same (later) temporal boundaries as the second tile. The spatial range may be divided among the second and third tiles on any suitable basis, e.g., to divide the heat as evenly as possible. The spatial range of the second tile may include a contiguous series of keys, and the spatial range of the third tile may also include a contiguous series of keys. The respective spatial ranges of the second and third tiles may be non-overlapping. In some embodiments, the storage node may acquire leases to the second and third tiles.

As shown in 1030, the storage node may store newer time-series data to the second and third tiles. The storage node may use the second tile to store time-series data within the first portion of the original spatial boundaries along with the later temporal boundaries. The storage node may use the third tile to store time-series data within the second portion of the original spatial boundaries along with the later temporal boundaries. For heat balancing purposes, the second tile and/or third tile may be located in a different database cluster than the first time. Because the temporal boundaries of the second and third tiles are in the future, no data movement need be performed to relocate one of these tiles to a different cluster immediately following the split.

Figure 11:
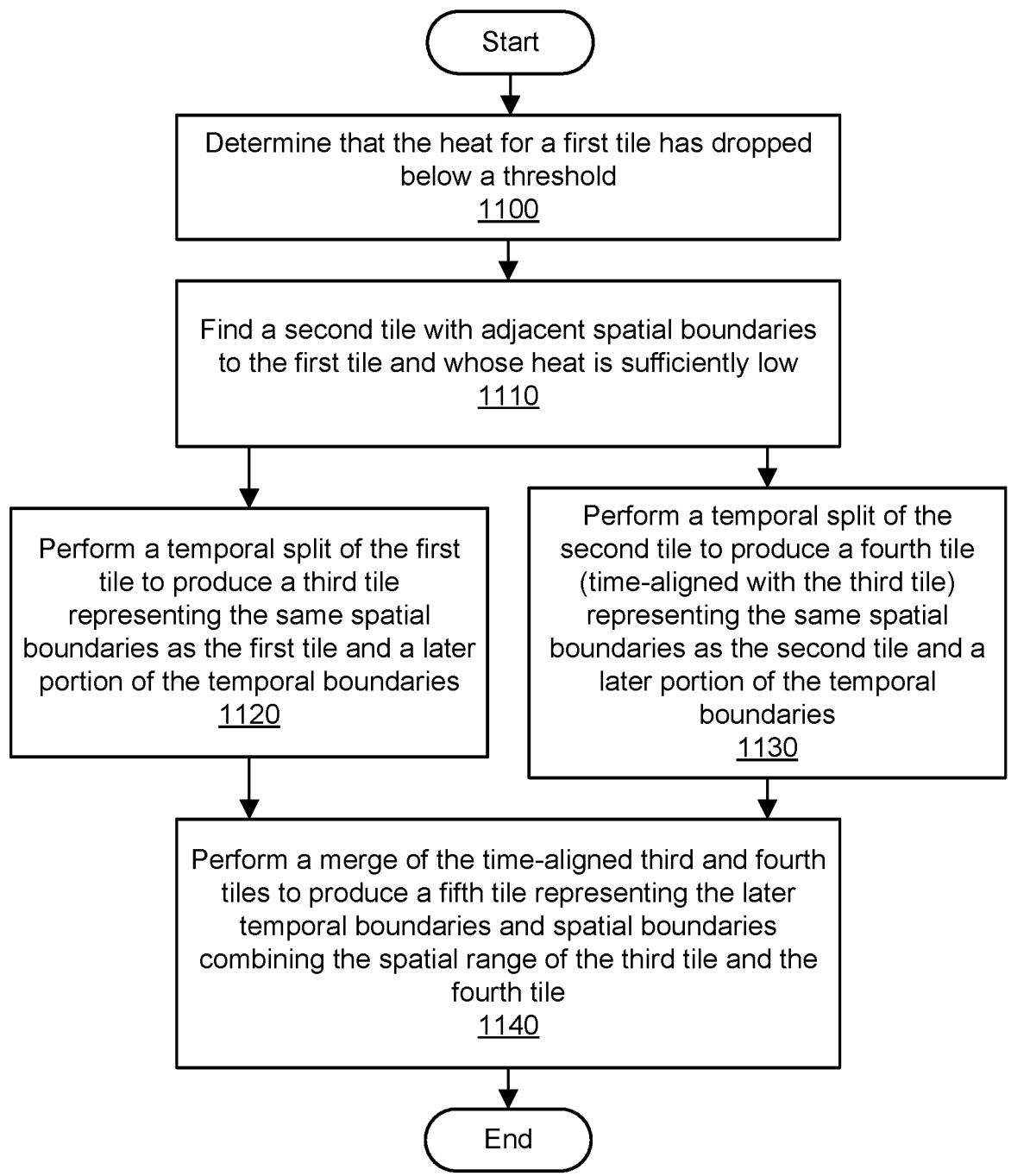
FIG. 11 is a flowchart illustrating a method for merging partitions across clusters in a time-series database, according to some embodiments.

FIG. 11 is a flowchart illustrating a method for merging partitions across clusters in a time-series database, according to some embodiments. A storage node may monitor the heat for tiles for which it holds leases, such as a first tile. The heat for the first tile may represent the throughput of data written to the tile or some other usage metric or rate. The first tile may have spatial boundaries defining a spatial range and temporal boundaries defining a temporal range. As shown in 1100, the method may determine that the heat for the first tile has fallen below a heat threshold (e.g., a particular throughput or other usage over the past N minutes). In some embodiments, a storage node with the lease to the tile may perform the heat analysis and decide to merge the tile with another tile.

As shown in 1110, the storage node may find a second tile whose heat is also beneath the threshold. The second tile may have the same temporal range as the first tile. The second tile may have an adjacent spatial range, such that the union of the two spatial ranges would not leave any gaps to be filled by other tiles. The storage node may identify such a tile by referring to an index of tiles according to their spatial boundaries. The second tile may be located on a different cluster or on the same cluster with respect to the first tile. In some embodiments, the lease to the second tile may already be held by the storage node. In some embodiments, the storage node may acquire the lease to the second tile.

As shown in 1120, the method (e.g., the storage node) may perform a temporal split of the first tile. The temporal split of the first tile may result in a third tile having the original spatial boundaries as the first tile but a later portion of the original temporal boundaries. The temporal split may also result in a modified first tile having the original spatial boundaries but an earlier portion of the original temporal boundaries. The temporal split point may be selected at a time at or after the current time. The temporal split point may be selected at a time after the latest timestamp of any time-series data already written to the first tile. By generating the third tile with temporal boundaries in the future, this tile may be empty at the time of the temporal split. The contents of the first tile may remain in their current location in a database cluster such that none of the contents need to be moved. Additionally, the first tile may continue to receive some time-series data within its spatial boundaries and modified temporal boundaries, depending on when the temporal split point is selected. In some embodiments, the storage node may acquire leases to the modified first tile and the third tile.

As shown in 1130, the method (e.g., the storage node) may perform a temporal split of the second tile. The temporal split of the second tile may result in a fourth tile having the original spatial boundaries as the second tile but the same later portion of the original temporal boundaries as the third tile. The temporal split may also result in a modified second tile having the original spatial boundaries but an earlier portion of the original temporal boundaries. To perform time alignment prior to the merge, the temporal split point for the second tile may be selected as the same point in time as the split point for the first tile. By generating the fourth tile with temporal boundaries in the future, this tile may be empty at the time of the temporal split. The contents of the second tile may remain in their current location in a database cluster such that none of the contents need to be moved. Additionally, the second tile may continue to receive some time-series data within its spatial boundaries and modified temporal boundaries, depending on when the temporal split point is selected. In some embodiments, the storage node may acquire leases to the modified second tile and the fourth tile.

As shown in 1140, the method (e.g., the storage node) may perform a spatial merge of the third tile and the fourth tile. The spatial merge may produce a fifth tile representing a union of the spatial boundaries of the third and fourth tiles along with the same temporal boundaries as the third and fourth tiles. The spatial range of the fifth tile may include a contiguous series of keys with no gaps to be filled by other tiles. In some embodiments, the storage node may acquire a lease to the fifth tile. As data is written to the fifth tile in the future, the fifth tile may have a heat approximating the combination of the heat of the first and second tiles. By consolidating time-series data in this manner, the storage resources and processing resources of the time-series database may be used more efficiently. The query processors 170 may continue to direct queries to appropriate ones of the tiles remaining such that no disruption to query processing is expected from the tile merging.

Heat Balancing in a Distributed Time-Series Database

Figure 12A:
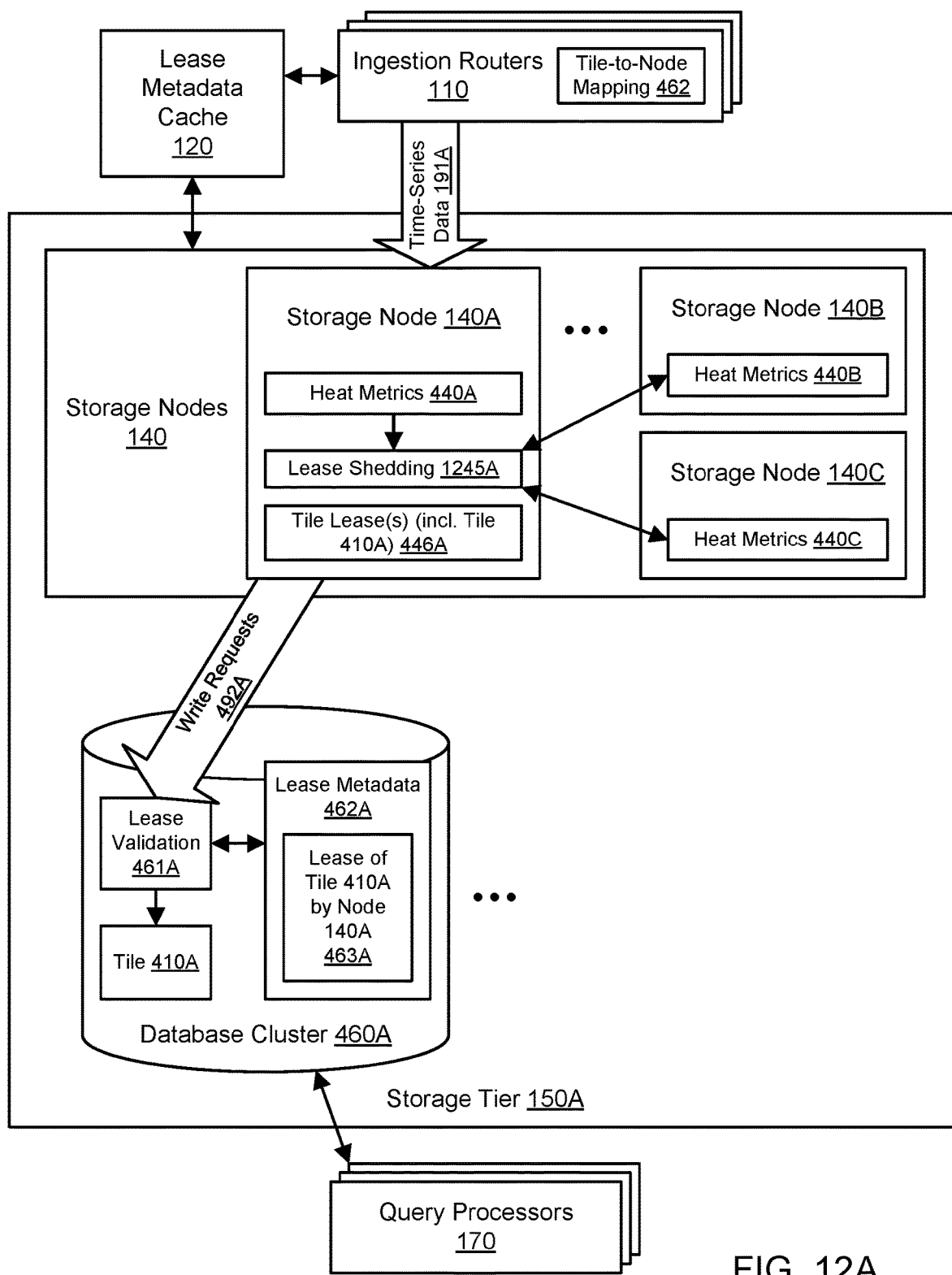
FIGS. 12A and 12B illustrate an example system environment for heat balancing among storage nodes in a time-series database, according to some embodiments.
Figure 12B:
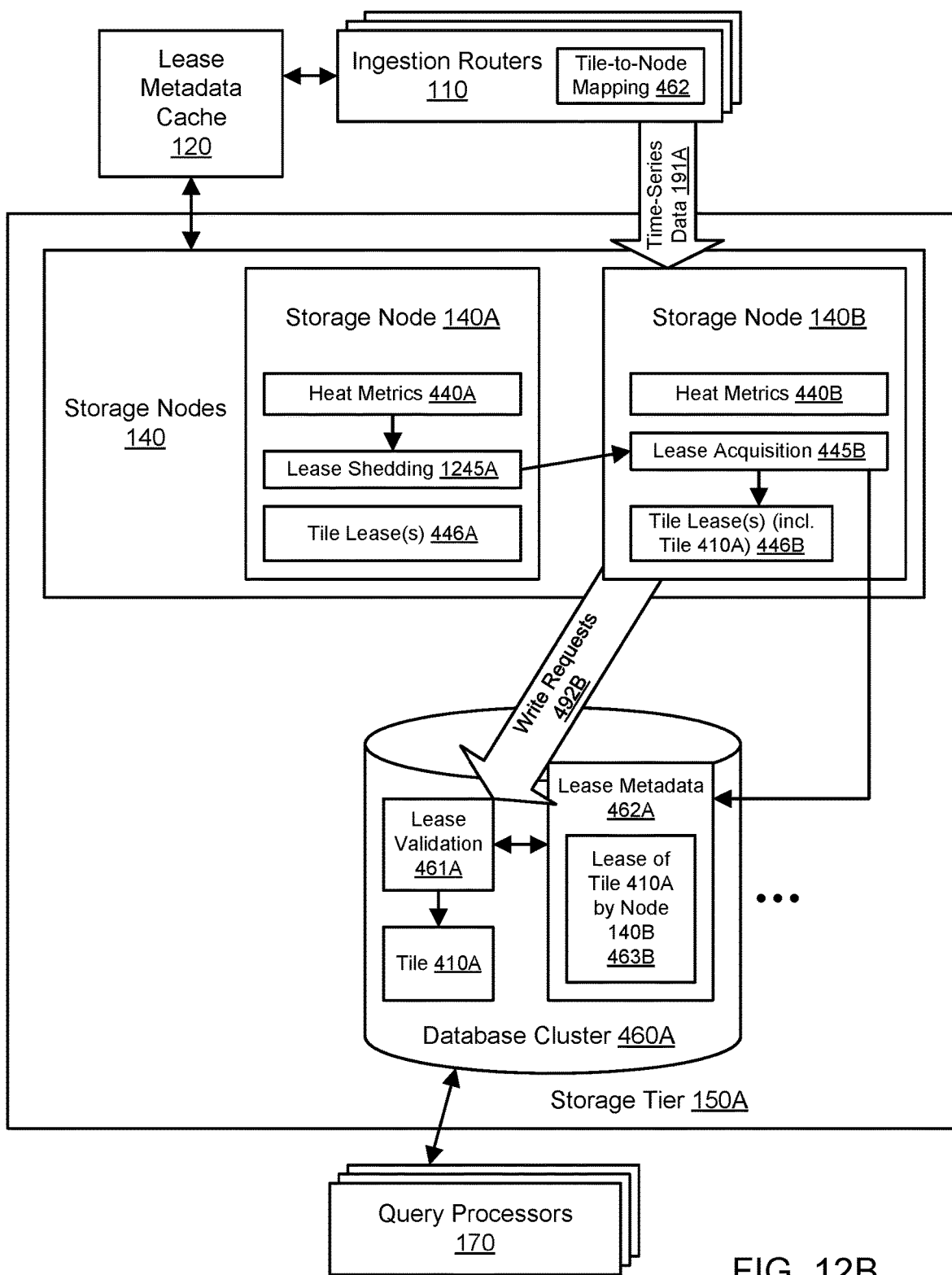

FIGS. 12A and 12B illustrate an example system environment for heat balancing among storage nodes in a time-series database, according to some embodiments. To maintain the high availability of the time-series database 100, resources at the storage node level may be subjected to heat balancing. As discussed above, the fleet of storage nodes 140 may hold leases to write time-series data to two-dimensional tiles in database clusters 460A-460M. A tile lease may permit a particular storage node to write time-series data to that tile, to the exclusion of other storage nodes at a given time. A storage node may hold one or more tile leases at a given time, and the leases may be associated with tiles in one or more database clusters.

Individual storage nodes may track their own heat or usage metrics and make independent decisions about heat balancing. For example, storage node 140A may maintain its own heat metrics 440A (e.g., in memory), storage node 140B may maintain its own heat metrics 440B (e.g., in memory), and storage node 140C may maintain its own heat metrics 440C (e.g., in memory). The heat metrics 440A-440C may indicate a throughput of time-series data or some other rate of receiving, writing, or otherwise processing time-series data at a particular storage node. In some embodiments, the heat metrics 440A-440C may indicate CPU usage metrics, e.g., for the last N minutes. The heat metrics for a particular storage node may represent an aggregate of tile-specific heat metrics for all the tiles whose leases are held by that storage node. In some embodiments, the heat metric 440A-440C may indicate tile-specific heat metrics as well as total or aggregate metrics for entire nodes.

As discussed above, tile leases may be assigned initially to storage nodes on a random or pseudo-random basis (including a best-of-2 or best-of-N approach) so that ingestion can begin without delay. However, a refinement mechanism may be used to reassign leases for heat balancing across the fleet of storage nodes 140. The refinement mechanism may permit an individual storage node such as node 140A to perform lease shedding 1245A. If the heat for the storage node 140A exceeds a threshold, then the storage node may initiate the lease shedding 1245A to one or more target storage nodes. In some embodiments, a storage node may initiate lease shedding 1245A if the CPU average over the last five minutes breaches 70%. In some embodiments, a target storage node for lease shedding should have an average CPU under 50% for the last five minutes to avoid lease exchange churn. In some embodiments, the storage node 140A may select a tile to shed with the second highest transactions per second (TPS) or other heat metric to avoid churn. In some embodiments, only one tile at a time may be shed per storage node.

To implement the lease shedding 1245A, the storage node 140A may identify a candidate set of other storage nodes. The candidate set may include two or more storage nodes such as storage nodes 140B and 140C. The candidate storage nodes may be selected on a random or pseudo-random basis. The storage node 140A may ask the storage nodes 140B and 140C to provide their respective heat metrics 440B and 440C. The provided heat metrics may relate to the same period of time (e.g., the last five minutes) as the heat metrics of the storage node 140A seeking to shed a lease. The storage node 140A may then select the candidate storage node with the lowest heat as a target for the lease shedding. In some embodiments, the storage node 140A may only continue with the lease shedding 1245A if at least one of the candidate storage nodes has lower heat than the storage node 140A. If none of the candidates have a lower heat at the current time, the storage node may select another set of candidates.

As shown in the example of FIG. 12B, the storage node 140A may identify the storage node 140B as having the lowest heat of the candidate storage nodes. The storage node 140A may perform lease shedding 1245A by reassigning one or more of its leases to the selected storage node 140B. In the example of FIG. 12B, the storage node 140A may seek to shed the lease for tile 410A. In seeking to shed the lease for tile 410A, the storage node 140A may ask the storage node 140B to take on the lease. If the storage node 140B agrees to do so, then the storage node 140B may perform lease acquisition 445B as discussed herein. Using the component 445B for lease acquisition, the storage node 140B may acquire a lease to the tile 410B (in the same database cluster 460A) by updating the lease metadata 462A to include metadata 463B indicating that the node 140B has the lease to the tile 410A. Lease acquisition 445B may include generating a lease identifier for a particular lease and storing the lease identifier in the corresponding database cluster 460A.

After the acquisition of the lease to tile 410A by storage node 140B, the ingestion routers 110 may be informed of the lease change and may update the tile-to-node mapping 462. Using the updated tile-to-node mapping 462, the ingestion routers 110 may route time-series data 191A to storage node 140B because that storage node holds the lease for the tile whose spatial and temporal boundaries include the time-series data 191A. Individual storage nodes may provide lease updates to ingestion routers 110 for updating the tile-to-node mapping 462. For example, upon performing lease acquisition 445B for tile 410A, the storage node 140B may pass this information on to the ingestion routers 110 so that proper routing of ingested time-series data is not delayed.

The reassignment of the lease for the tile 410A may result in no data movement from database cluster to database cluster. The storage node 140B may submit write requests 492B to write elements of time-series data 191A to the tile 410A in the same database cluster 460A. Using the component 461A for lease validation, the cluster 460A may validate the write requests 492B and permit the writes to the tile 410A because the lease metadata 462A includes an appropriate entry 463B. However, if the storage node 140A that previously had the lease were to submit write requests for the tile 410A at this point in time, then the cluster 460A should reject such requests based on the lease metadata 462B. By performing heat balancing among storage nodes in this manner, the time-series database 100 may maintain high availability.

Figure 13A:
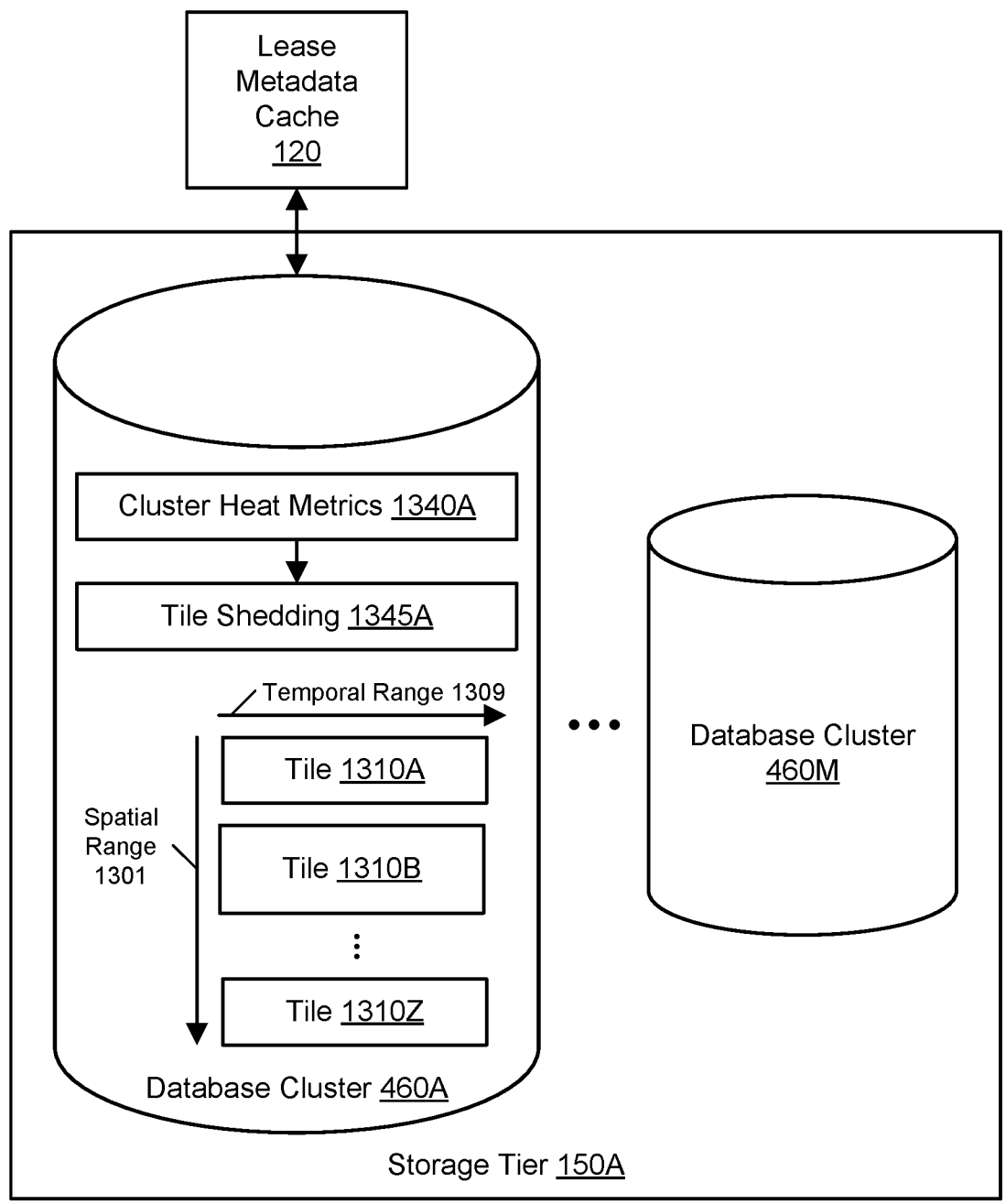
FIGS. 13A, 13B, and 13C illustrate an example system environment for heat balancing among database clusters in a time-series database, according to some embodiments.
Figure 13B:
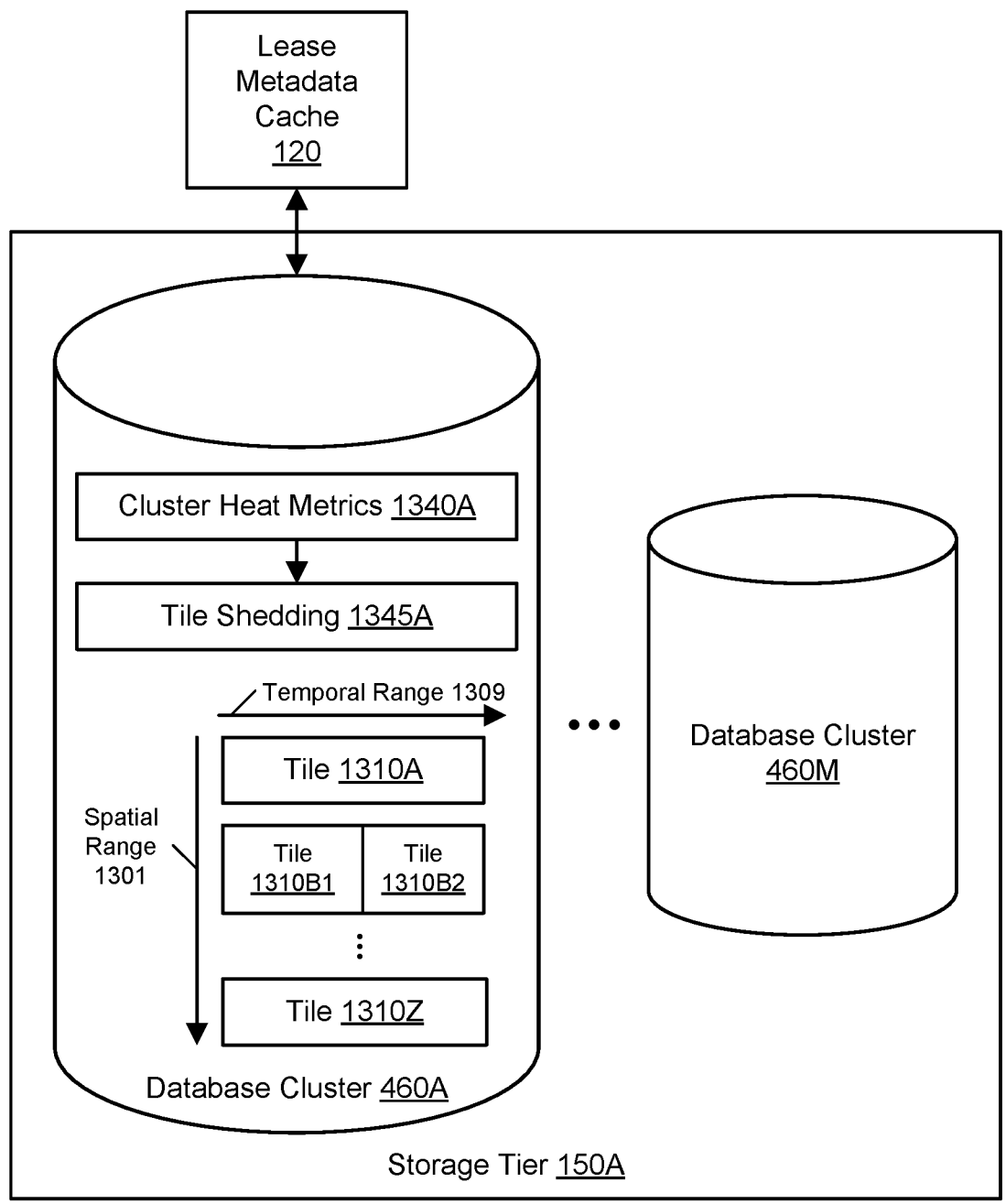
Figure 13C:
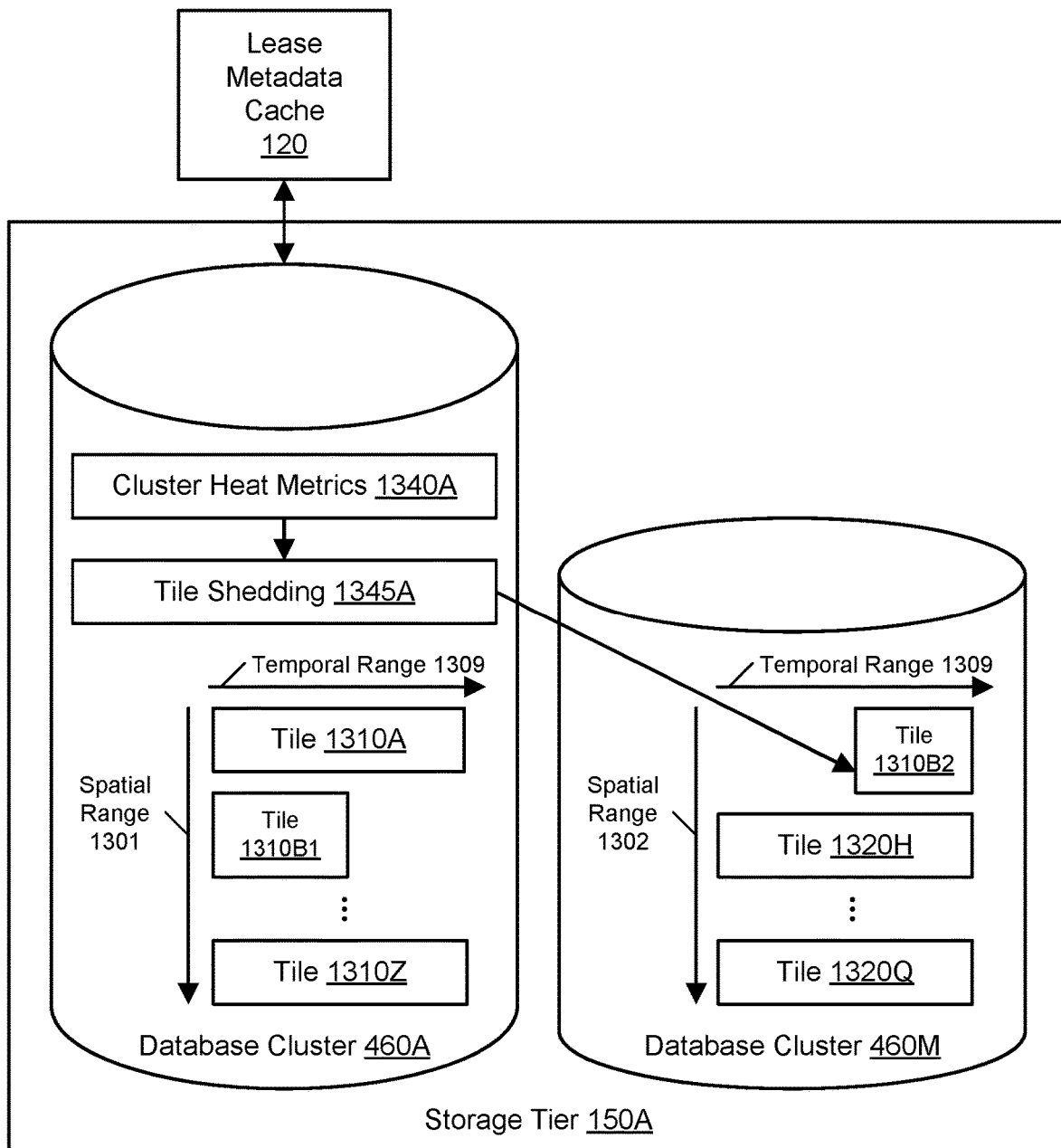

FIGS. 13A, 13B, and 13C illustrate an example system environment for heat balancing among database clusters in a time-series database, according to some embodiments. To maintain the high availability of the time-series database 100, resources at the database cluster level may be subjected to heat balancing. Individual database clusters 460A-460M may track their own heat or usage metrics. If the heat for a database cluster exceeds a threshold, then the cluster may split a tile temporally such that new data for the tile is written to another cluster. As shown in FIG. 13A, a database cluster 460A may include a component 1340A for monitoring cluster heat metrics. The cluster heat metrics 1340A may indicate a throughput of time-series data or some other rate of receiving, writing, or otherwise processing time-series data at a particular database cluster 460A. The heat metrics 1340A for a particular cluster 460A may represent an aggregate of tile-specific heat metrics for all the tiles that are stored by that cluster. In some embodiments, the heat metrics 1340A indicate tile-specific heat metrics as well as total or aggregate metrics for the entire cluster 460A.

The cluster 460A may store a set of tiles such as tiles 1310A and 1310B through 1310Z. The tiles 1310A-1310Z may represent a temporal range 1309 (e.g., the current hour) and may be distributed across a spatial range 1301. The tiles 1310A-1310Z need not represent a contiguous segment of the spatial range 1301. If the heat 1340A for the database cluster 460A exceeds a threshold, then the cluster may initiate tile shedding 1345A to lower its heat. The tile shedding 1345A may seek to move the spatial ranges for one or more of the tiles 1310A-1310Z to one or more other database clusters. However, to minimize data movement across clusters, tile shedding 1345A may be performed for future segments of the temporal range 1309.

The tile(s) to be shed may be selected on any suitable basis. In some embodiments, the hottest tile(s) may be selected for tile shedding. In some embodiments, one or more tiles may be selected for tile shedding based (at least in part) on their aggregate heat such that their removal will allow the database cluster 13B to fall below the heat threshold that triggered the tile shedding 1345A. As shown in FIG. 13B, for example, tile 1310B may be selected for tile shedding as it represents a larger spatial range with greater heat than tiles 1310A or 1310Z. Another database cluster 460M may be asked to take on the spatial range associated with the tile 1310B to be shed. In some embodiments, the placement service 850 may be asked to find a destination for a tile to be shed. The placement service 850 may track the heat or other usage metrics for the database clusters 460A-460M, e.g., for deciding where to store individual tiles.

To begin shedding the tile 1310B, a temporal split of the tile may be performed. The temporal split of tile 1310B may result in a tile 1310B2 having the original spatial boundaries as tile 1310B but a later portion of the original temporal boundaries. The temporal split may also result in a tile 1310B1 having the original spatial boundaries but an earlier portion of the original temporal boundaries. The tile 1310B1 may represent a modified version of the original tile 1310B, e.g., by storing the tile and its contents in the original location but with modified tile metadata. The temporal split point may be selected at a time after the latest timestamp of any time-series data already written to the original tile 1310B. By generating the second tile 1310B2 with temporal boundaries in the future, this tile may be empty at the time of the temporal split. The tile 1310B1 may remain in its current location in the database cluster 460A such that none of its contents need to be moved. Additionally, the tile 1310B1 may continue to receive some time-series data, depending on when the temporal split point is selected.

As shown in FIG. 13C, to complete the tile shedding 1345A, the tile 1310B2 may be recreated on the target database cluster 460M. The cluster 460M may also have additional tiles 1320H through 1320Q across a different spatial range 1302. Again, the tile 1310B2 on the cluster 460M may have the original spatial boundaries as tile 1310B but a later portion of the original temporal boundaries. The tile 1310B1 (representing a modified version of the original tile 1310B) may remain on the original cluster 460A such that the contents of the original tile 1310B need not be moved. By generating the second tile 1310B2 with temporal boundaries in the future, this tile may be empty at the time of its creation on the target cluster 460M, and no time-series data need be moved from cluster 460A to cluster 460M during the tile shedding. Tile splitting and tile moving in this manner may include adding indirection pointers from the original tile to newly created tiles and from the newly created tiles to the original tile.

Figure 14A:
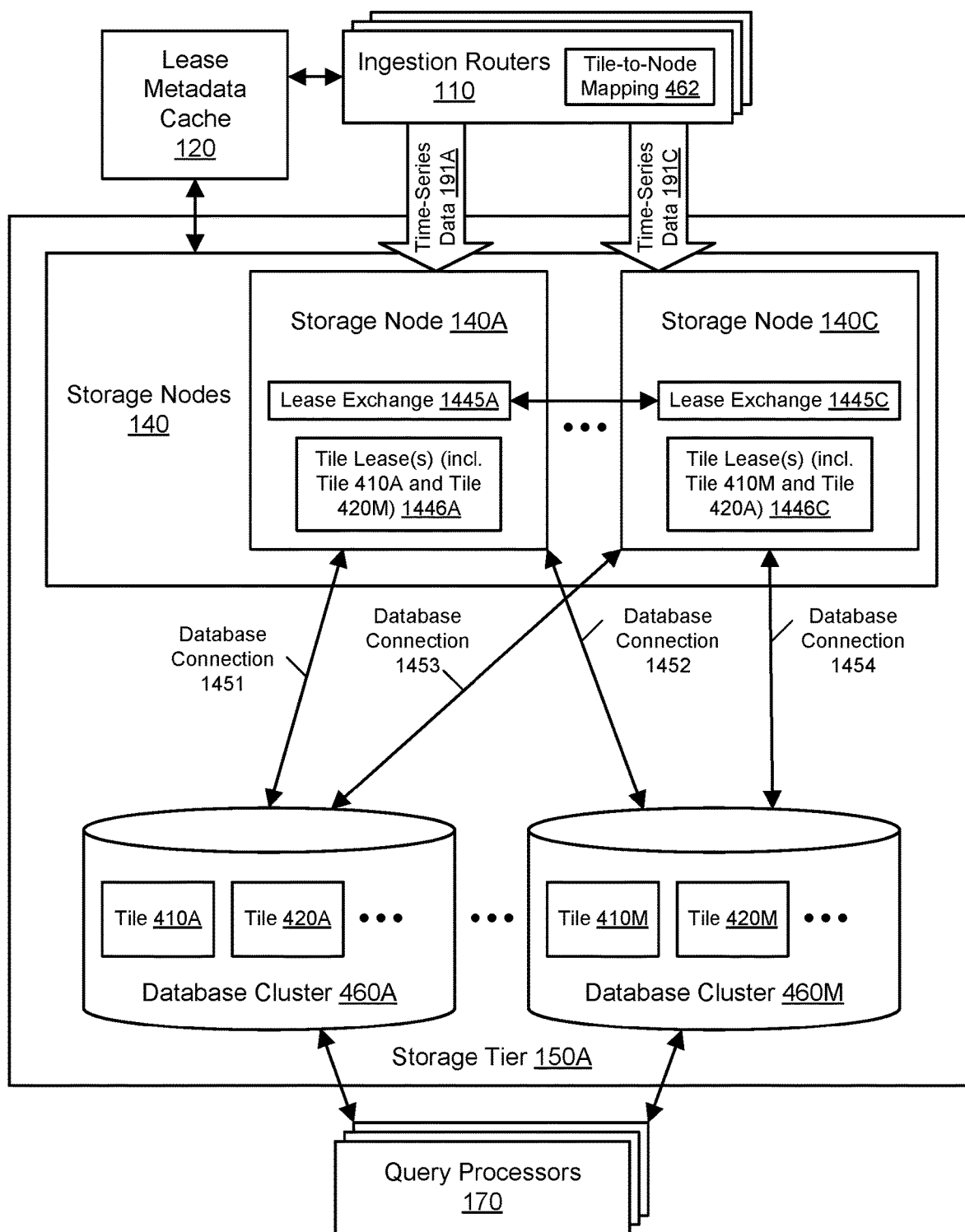
FIGS. 14A and 14B illustrate an example system environment for database connection management in a time-series database, according to some embodiments.
Figure 14B:
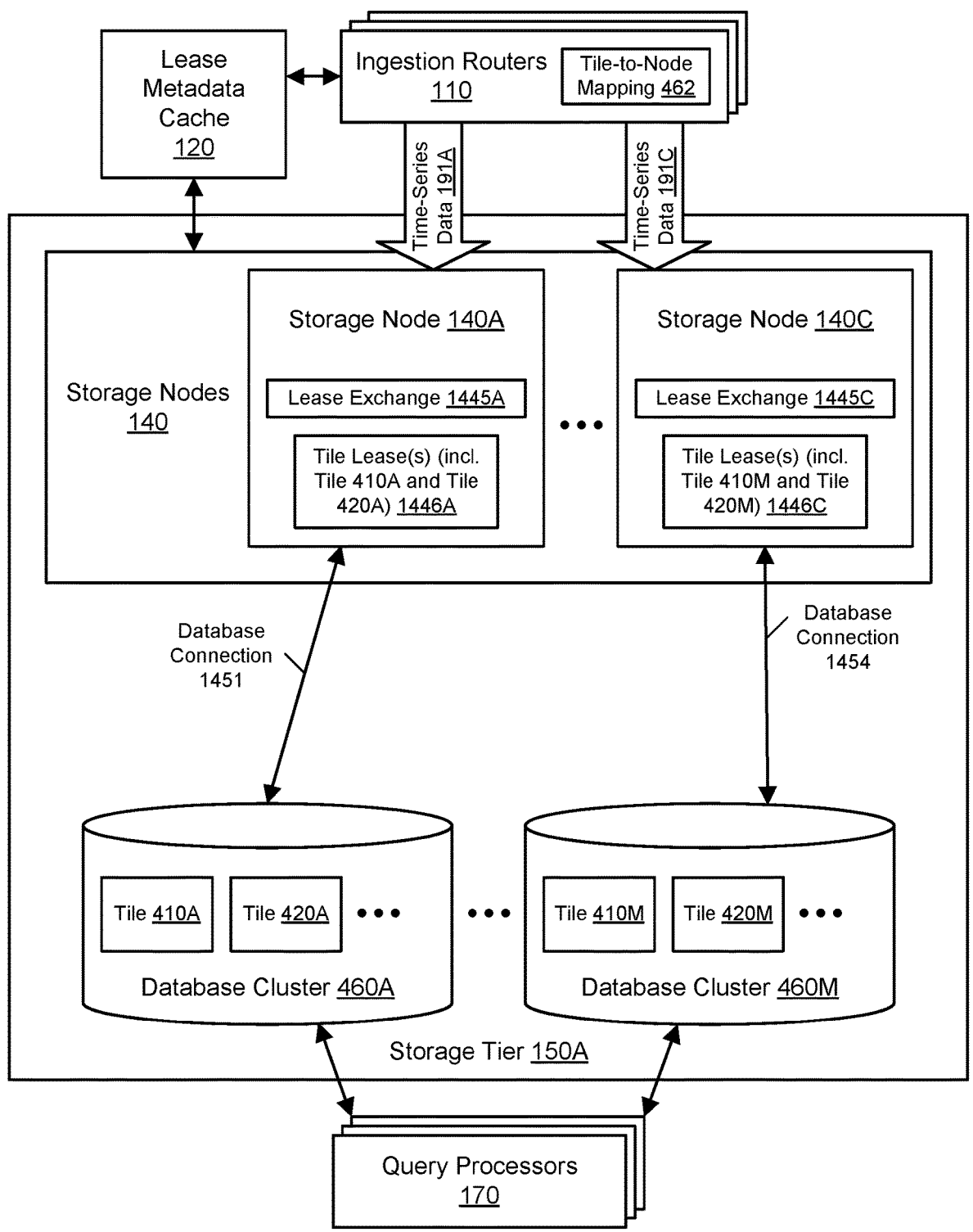

FIGS. 14A and 14B illustrate an example system environment for database connection management in a time-series database, according to some embodiments. Storage nodes may maintain connections to database clusters that host tiles for which the storage nodes hold leases. For example, as shown in FIG. 14A, storage node 140A may hold tile leases 1446A including tile 410A on database cluster 460A and tile 420M on database cluster 460M. As also shown in FIG. 14A, storage node 140C may hold tile leases 1446C including tile 410M on database cluster 460M and tile 420A on database cluster 460A. Each pair of storage node and database cluster may require an individual database connection. For example, storage node 140A may require one database connection 1451 to write time-series data to tile 410A in database cluster 460A and another database connection 1452 to write time-series data to tile 420M in database cluster 460M. Similarly, storage node 140C may require one database connection 1453 to write time-series data to tile 420A in database cluster 460A and another database connection 1454 to write time-series data to tile 410M in database cluster 460M.

If many storage nodes each have connections to many database clusters, then some clusters may be overloaded or unavailable due to connection overhead or restrictions on the number of concurrent connections. The database connection mesh may be managed by having storage nodes exchange leases to reduce the number of concurrent connections. To reduce the number of concurrent database connections across the database clusters 460A-460M, the storage nodes 140 may implement a lease exchange technique. As shown in FIG. 14A, storage node 140A may implement lease exchange 1445A, and storage node 140C may implement lease exchange 1445C. The goal of the lease exchange 1445A-1445C may be to consolidate leases for particular clusters on particular storage nodes so that the total number of database connections 1451-1454 is reduced.

The storage node 140A may initiate the lease exchange 1445A or the storage node 140C may initiate the lease exchange 1445C. Whichever of the storage nodes initiates the lease exchange, it may ask the database cluster 460A for tile lease metadata 462A, the database cluster 460A for tile lease metadata 462M, and/or any other database clusters for which the storage node holds leases for their tile lease metadata. Using the tile lease metadata 462A-462M, the storage node may identify one or more other storage nodes that also hold tile leases on at least two of the same database clusters. For example, the storage node 140A may determine that it shares a similar footprint on clusters 460A and clusters 460M with storage node 140C. To perform the lease exchange, the storage node 140A may ask the storage node 140C to take on the leases to tiles on database cluster 460M (including tile 420M and any other tiles on that cluster to which node 140A holds leases), and the storage node 140C may likewise ask the storage node 140A to take on the leases to tiles on database cluster 460A (including tile 420A and any other tiles on that cluster to which node 140C holds leases).

As shown in FIG. 14B, the result of the tile shedding may be an updated set of tile leases 1446A for storage node 140A (including leases to tiles 410A and 420A) and an updated set of tile leases 1446C for storage node 140C (including leases to tiles 410M and 420M). As before the lease exchange, each pair of storage node and database cluster may require an individual database connection. However, because of the lease exchange, storage node 140A may require only one database connection 1451 to write time-series data to tiles 410A and 420A in database cluster 460A, and storage node 140C may require only one database connection 1454 to write time-series data to tiles 410M and 420M in database cluster 460M. If 50% of storage nodes initiate such a lease exchange, then the total number of database connections across the clusters 460A-460M may be significantly reduced. In the example shown in FIG. 14B, the total number of database connections is reduced from four to two across all of the clusters and from two to one on each individual cluster. Because storage nodes are loosely coupled to database clusters using leases, time-series data movement from cluster to cluster need not be performed in consolidating the leases as shown in FIG. 14B.

Figure 15:
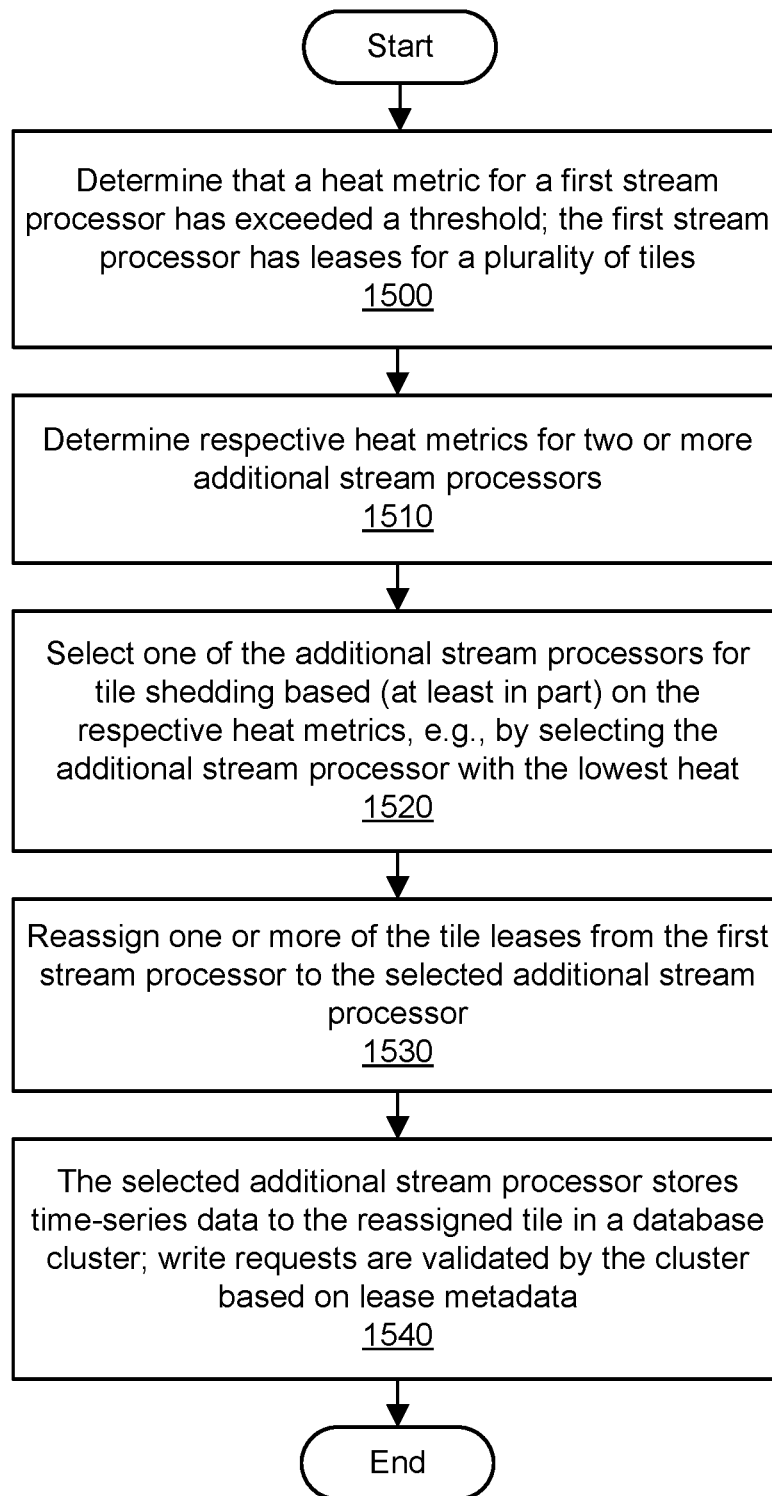
FIG. 15 is a flowchart illustrating a method for heat balancing among storage nodes in a time-series database, according to some embodiments.

FIG. 15 is a flowchart illustrating a method for heat balancing among storage nodes in a time-series database, according to some embodiments. As shown in 1500, the method may determine that a heat metric for a first storage node has exceeded a threshold. Individual storage nodes may track and analyze their own heat or usage metrics using background processes. The heat metrics may indicate a throughput of time-series data or some other rate of receiving, writing, or otherwise processing time-series data at a particular storage node. The first storage node may hold leases to a plurality of tiles, each representing a spatial range and a temporal range. Due to the first storage node exceeding the heat threshold, it may seek to perform lease shedding of one or more leases to reduce its own heat.

As shown in 1510, the first storage node may identify a candidate set of other storage nodes. The candidate set may include two or more storage nodes. The candidate storage nodes may be selected on a random or pseudo-random basis. The first storage node may ask the storage nodes to provide their respective heat metrics. As shown in 1520, the first storage node may then select one of the candidate storage nodes based (at least in part) on the heat metrics. For example, the first storage node may select the candidate storage node with the lowest heat as a target for the lease shedding. In some embodiments, the first storage node may only continue with the lease shedding if at least one of the candidate storage nodes has lower heat than the first storage node. If none of the candidates have a lower heat at the current time, then the first storage node may select another set of candidates and repeat the operations shown in 1510 and 1520.

As shown in 1530, the first storage node may perform lease shedding by reassigning one or more of its tile leases to the selected storage node. To shed the one or more leases, the first storage node may ask the other storage node to acquire the lease(s). If the other storage node agrees to do so, then that storage node may perform lease acquisition by updating the lease metadata in the database cluster(s) for the shed leases to include metadata indicating that one or more leases have been updated.

The shed tiles may remain in their same database clusters. As shown in 1540, the selected storage node may store the time-series data to the reassigned tile(s) in the database cluster(s). The database cluster(s) may use their local tile lease metadata to approve or deny requests from particular storage nodes to write time-series data to particular tiles. Write requests from the selected storage node to a reassigned tile may be validated by a cluster using the tile lease metadata that indicates that the selected storage node has the lease to the tile. However, write requests from the first storage node to one of the shed tiles may be denied by the cluster using the tile lease metadata that indicates that the first storage node no longer has the lease to the tile.

Illustrative Computer System

In at least some embodiments, a computer system that implements a portion or all of one or more of the technologies described herein may include a computer system that includes or is configured to access one or more computer-readable media. FIG. 16 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 16 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

The foregoing may be better understood in view of the following clauses:

Clause 1. A system, comprising:
a distributed time-series database comprising one or more ingestion routers, a plurality of storage nodes including a first storage node, and one or more database clusters including a first database cluster, wherein the distributed time-series database stores time-series data of a plurality of time series using the one or more database clusters, and wherein the distributed time-series database comprises a plurality of processors and a plurality of memories to store computer-executable instructions that, when executed, cause the processors to:
determine an assignment of a lease for a two-dimensional tile representing spatial and temporal boundaries of the time-series data, wherein the lease is assigned to the first storage node;
receive, by the one or more ingestion routers, elements of the time-series data within the spatial and temporal boundaries;
route, by the one or more ingestion routers to the first storage node, the elements of the time-series data within the spatial and temporal boundaries based at least in part on the assignment of the lease; and
store, by the first storage node into the two-dimensional tile in the first database cluster, the elements of the time-series data within the spatial and temporal boundaries, wherein data indicating the assignment of the lease to the first storage node is stored by the first database cluster, and wherein write requests by the first storage node to the tile are validated by the first database cluster based at least in part on the assignment of the lease.

Clause 2. The system as recited in clause 1, wherein the plurality of memories store additional computer-executable instructions that, when executed, cause the processors to:
determine a candidate set of the storage nodes for the assignment of the lease responsive to receipt of time-series data associated with the lease, wherein the candidate set comprises the first storage node and a second storage node, and wherein the first storage node and the second storage node are randomly or pseudo-randomly selected for the candidate set;
determine usage metrics for the first storage node and the second storage node; and
select the first storage node for the assignment of the lease based at least in part on the usage metrics.

Clause 3. The system as recited in clause 1, wherein the plurality of memories store additional computer-executable instructions that, when executed, cause the processors to:
  store, by a second storage node of the plurality of storage nodes to the first database cluster, data indicating a new assignment of the lease, wherein the lease is newly assigned to the second storage node;
  store, by second storage node into the tile in the first database cluster, additional elements of the time-series data within the spatial and temporal boundaries, wherein one or more write requests by the second storage node to the tile are validated by the first database cluster based at least in part on the new assignment of the lease, and wherein one or more write requests by the first storage node to the tile are rejected by the first database cluster based at least in part on the new assignment of the lease.

Clause 4. The system as recited in clause 3, wherein the plurality of memories store additional computer-executable instructions that, when executed, cause the processors to:
  delay a transfer of the lease from the second storage node back to the first storage node by at least a threshold duration of time after the new assignment of the lease.

Clause 5. A method, comprising:
  determining, by a time-series database, an assignment of a lease for a tile representing spatial and temporal boundaries of time-series data, wherein the lease is assigned to a first storage node of a plurality of storage nodes;
  routing, by the time-series database to the first storage node based at least in part on the assignment of the lease, the elements of the time-series data within the spatial and temporal boundaries; and
  storing, by first storage node into the tile in a database cluster, the elements of the time-series data, wherein write requests by the first storage node to the tile are validated by the database cluster based at least in part on the assignment of the lease.

Clause 6. The method as recited in clause 5, further comprising:
  determining a candidate set of the storage nodes for the assignment of the lease responsive to receiving time-series data associated with the lease, wherein the candidate set comprises the first storage node and a second storage node;
  determining usage metrics for the first storage node and the second storage node; and
  selecting the first storage node for the assignment of the lease based at least in part on the usage metrics.

Clause 7. The method as recited in clause 6, wherein the first storage node and the second storage node are randomly or pseudo-randomly selected for the candidate set as a data plane operation.

Clause 8. The method as recited in clause 5, further comprising:
  storing, by a second storage node of the plurality of storage nodes to the database cluster, data indicating a new assignment of the lease, wherein the lease is newly assigned to the second storage node;
  storing, by second storage node into the tile in the database cluster, additional elements of the time-series data within the spatial and temporal boundaries, wherein one or more write requests by the second storage node to the tile are validated by the database cluster based at least in part on the new assignment of the lease, and wherein one or more write requests by the first storage node to the tile are rejected by the database cluster based at least in part on the new assignment of the lease.

Clause 9. The method as recited in clause 8, further comprising:
  delaying a transfer of the lease from the second storage node back to the first storage node by at least a threshold duration of time after the new assignment of the lease.

Clause 10. The method as recited in clause 5, further comprising
  determining, by the time-series database, a new assignment of the lease for the tile, wherein the lease is newly assigned to a second storage node of the plurality of storage nodes, and wherein the new assignment of the lease is determined based at least in part on a failure of the first storage node or a throughput metric of the first storage node;
  routing, by the time-series database to the second storage node based at least in part on the new assignment of the lease, additional elements of the time-series data within the spatial and temporal boundaries; and
  storing, by second storage node into the tile in the database cluster, the additional elements of the time-series data, wherein one or more write requests by the second storage node to the tile are validated by the database cluster based at least in part on the new assignment of the lease.

Clause 11. The method as recited in clause 10, further comprising:
  delaying a transfer of the lease from the second storage node to a third storage node by at least a threshold duration of time after the new assignment of the lease.

Clause 12. The method as recited in clause 5, further comprising:
  determining usage metrics for a plurality of database clusters including the database cluster;
  selecting the database cluster for storing the tile based at least in part on the usage metrics; and
  generating, by the first storage node based at least in part on the assignment of the lease, the tile in the database cluster.

Clause 13. One or more non-transitory computer-readable storage media storing program instructions that, when executed on or across one or more processors, perform:
  determining, by a time-series database, an assignment of a lease for a tile representing spatial and temporal boundaries of time-series data, wherein the lease is assigned to a first storage node of a plurality of storage nodes;
  routing, by one or more ingestion routers of the time-series database to the first storage node based at least in part on the assignment of the lease, the elements of the time-series data within the spatial and temporal boundaries; and
  storing, by first storage node into the tile in a database cluster, the elements of the time-series data, wherein write requests by the first storage node to the tile are validated by the database cluster based at least in part on the assignment of the lease.

Clause 14. The one or more non-transitory computer-readable storage media as recited in clause 13, further comprising additional program instructions that, when executed on or across the one or more processors, perform:
  determining a candidate set of the storage nodes for the assignment of the lease responsive to receiving time-series data associated with the lease, wherein the candidate set comprises the first storage node and a second storage node;

determining usage metrics for the first storage node and the second storage node; and selecting the first storage node for the assignment of the lease based at least in part on the usage metrics.

Clause 15. The method as recited in clause 14, wherein the first storage node and the second storage node are randomly or pseudo-randomly selected for the candidate set.

Clause 16. The one or more non-transitory computer-readable storage media as recited in clause 13, further comprising additional program instructions that, when executed on or across the one or more processors, perform:

storing, by a second storage node of the plurality of storage nodes to the database cluster, data indicating a new assignment of the lease, wherein the lease is newly assigned to the second storage node;

storing, by second storage node into the tile in the database cluster, additional elements of the time-series data within the spatial and temporal boundaries, wherein one or more write requests by the second storage node to the tile are validated by the database cluster based at least in part on the new assignment of the lease, and wherein one or more write requests by the first storage node to the tile are rejected by the database cluster based at least in part on the new assignment of the lease.

Clause 17. The one or more non-transitory computer-readable storage media as recited in clause 16, further comprising additional program instructions that, when executed on or across the one or more processors, perform:

delaying a transfer of the lease from the second storage node back to the first storage node by at least a threshold duration of time after the new assignment of the lease.

Clause 18. The one or more non-transitory computer-readable storage media as recited in clause 13, further comprising additional program instructions that, when executed on or across the one or more processors, perform:

determining, by the time-series database, a new assignment of the lease for the tile, wherein the lease is newly assigned to a second storage node of the plurality of storage nodes, and wherein the new assignment of the lease is determined based at least in part on an unavailability of the first storage node;

routing, by the time-series database to the second storage node based at least in part on the new assignment of the lease, additional elements of the time-series data within the spatial and temporal boundaries; and storing, by second storage node into the tile in the database cluster, the additional elements of the time-series data, wherein one or more write requests by the second storage node to the tile are validated by the database cluster based at least in part on the new assignment of the lease, and wherein one or more write requests by the first storage node to the tile are rejected by the database cluster based at least in part on the new assignment of the lease.

Clause 19. The one or more non-transitory computer-readable storage media as recited in clause 18, further comprising additional program instructions that, when executed on or across the one or more processors, perform:

delaying a transfer of the lease from the second storage node to a third storage node by at least a threshold duration of time after the new assignment of the lease.

Clause 20. The one or more non-transitory computer-readable storage media as recited in clause 18, further comprising additional program instructions that, when executed on or across the one or more processors, perform:

sending, by the first storage node to one or more ingestion routers of the time-series database, data indicating the new assignment of the lease.

Additionally, the foregoing may be better understood in view of the following clauses:

Clause 21. A system, comprising:

a distributed time-series database comprising one or more storage nodes including a first storage node and a plurality of database clusters, wherein the distributed time-series database stores time-series data of a plurality of time series using the plurality of database clusters, wherein a lease for a first tile representing spatial boundaries and temporal boundaries of the time-series data is assigned to the first storage node, and wherein the distributed time-series database comprises a plurality of processors and a plurality of memories to store computer-executable instructions that, when executed, cause the processors to:

determine that a heat metric for the first tile has exceeded a threshold, wherein the heat metric is indicative of a rate of storing elements of the time-series data within the spatial and temporal boundaries of the first tile;

perform a temporal split of the first tile based at least in part on the heat metric, wherein the temporal split generates an intermediate tile representing the spatial boundaries and a later portion of the temporal boundaries, wherein the later portion of the temporal boundaries begins at or after a current point in time;

perform a spatial split of the intermediate tile, wherein the spatial split generates a second tile representing a first portion of the spatial boundaries and the later portion of the temporal boundaries, and wherein the spatial split generates a third tile representing a second portion of the spatial boundaries and the later portion of the temporal boundaries;

store, by the first storage node into the second tile in the plurality of database clusters, elements of the time-series data within the first portion of the spatial boundaries and the later portion of the temporal boundaries; and store, by the first storage node into the third tile in the plurality of database clusters, elements of the time-series data within the second portion of the spatial boundaries and the later portion of the temporal boundaries.

Clause 22. The system as recited in clause 21, wherein the second tile and the third tile are stored using different ones of the database clusters.

Clause 23. The system as recited in clause 21, wherein temporal boundaries are split into an earlier portion and the later portion at or after the current point in time, and wherein elements of the time-series data within the spatial boundaries and the earlier portion of the temporal boundaries are maintained in the first tile in a particular database cluster of the plurality of database clusters.

Clause 24. The system as recited in clause 21, wherein a lease for the second tile is assigned to the first storage node, and wherein a lease for the third tile is assigned to the first storage node.

Clause 25. A method, comprising:

determining, by a time-series database storing a first tile, that a heat metric for the first tile has exceeded a threshold, wherein the time-series database stores time-series data of a plurality of time series using a plurality of database clusters, wherein the first tile represents spatial boundaries and temporal boundaries of the time-series data, and wherein a lease for the first tile is assigned to a storage node;

performing a split of the first tile based at least in part on the heat metric, wherein performing the split comprises:
  determining a temporal split point in the temporal boundaries of the first tile;
  generating a second tile representing a first portion of the spatial boundaries and a later portion of the temporal boundaries after the temporal split point; and
  generating a third tile representing a second portion of the spatial boundaries and the later portion of the temporal boundaries after the temporal split point;

storing, by the storage node into the second tile in the plurality of database clusters, elements of the time-series data within the first portion of the spatial boundaries and the later portion of the temporal boundaries; and storing, by the storage node into the third tile in the plurality of database clusters, elements of the time-series data within the second portion of the spatial boundaries and the later portion of the temporal boundaries.

Clause 26. The method as recited in clause 25, wherein the second tile and the third tile are stored using different ones of the database clusters.

Clause 27. The method as recited in clause 25, wherein the temporal split point represents a time at or after a current point in time, and wherein elements of the time-series data within the spatial boundaries and the earlier portion of the temporal boundaries are maintained in the first tile in a first database cluster of the plurality of database clusters.

Clause 28. The method as recited in clause 27, further comprising:
  performing, by a query processor using the first tile, a query of the elements of the time-series data within the spatial boundaries and the earlier portion of the temporal boundaries.

Clause 29. The method as recited in clause 25, further comprising:
  determining, by the time-series database storing a fourth tile, that a heat metric for the fourth tile has exceeded the threshold, wherein the fourth tile represents additional spatial boundaries and fourth temporal boundaries of the time-series data, wherein a lease for the fourth tile is assigned to the storage node, and wherein the heat metric for the fourth tile has exceeded the threshold at a point in time after an ending time of the additional temporal boundaries; and
  performing a spatial split of the fourth tile, wherein the spatial split of the fourth tile generates a fifth tile representing a first portion of the additional spatial boundaries and the additional temporal boundaries, wherein the spatial split of the fourth tile generates a sixth tile representing a second portion of the additional spatial boundaries and the additional temporal boundaries, wherein the fourth tile is stored using a first database cluster of the plurality of database clusters, wherein the fifth tile is stored using a second database cluster of the plurality of database clusters, and wherein the sixth tile is stored using a third database cluster of the plurality of database clusters.

Clause 30. The method as recited in clause 25, further comprising:
  determining, by the storage node using a placement service, a first database cluster of the plurality of database clusters in which the second tile is stored and a second database cluster of the plurality of database clusters in which the third tile is stored.

Clause 31. The method as recited in clause 25, further comprising:
  determining, by the storage node, that a heat metric for a fourth tile has passed below a second threshold, wherein the fourth tile represents second spatial boundaries and second temporal boundaries of the time-series data, and wherein a lease for the fifth tile is assigned to the storage node;
  identifying, by the storage node, a fifth tile having third temporal boundaries and adjacent spatial boundaries to the second spatial boundaries; and
  performing a temporal split of the fourth tile, wherein the temporal split of the fourth tile generates a sixth tile representing the second spatial boundaries and a later portion of the second temporal boundaries, and wherein a lease for the sixth tile is assigned to the storage node;
  performing a temporal split of the fifth tile, wherein the temporal split of the fifth tile generates a seventh tile representing the adjacent spatial boundaries and the later portion of the second temporal boundaries, and wherein a lease for the seventh tile is assigned to the storage node;
  performing a merge of the fifth tile and the seventh tile into an eighth tile, wherein the eighth tile represents the second spatial boundaries, the adjacent spatial boundaries, and the later portion of the second temporal boundaries, and
  wherein a lease for the eighth tile is assigned to the storage node.

Clause 32. The method as recited in clause 25, wherein the heat metric is indicative of a rate of throughput for elements of the time-series data within the spatial and temporal boundaries of the first tile.

Clause 33. One or more non-transitory computer-readable storage media storing program instructions that, when executed on or across one or more processors, perform:
  determining, by a time-series database storing a first tile, that a heat metric for the first tile has exceeded a threshold, wherein the time-series database stores time-series data of a plurality of time series using a plurality of database clusters, wherein the first tile represents spatial boundaries and temporal boundaries of the time-series data, and wherein a lease for the first tile is assigned to a storage node;
  performing a temporal split of the first tile based at least in part on the heat metric, wherein the temporal split generates a temporary tile representing the spatial boundaries and a later portion of the temporal boundaries;
  performing a spatial split of the temporary tile, wherein the spatial split generates a second tile representing a first portion of the spatial boundaries and the later portion of the temporal boundaries, and wherein the spatial split generates a third tile representing a second portion of the spatial boundaries and the later portion of the temporal boundaries;
  storing, by the storage node into the second tile in the plurality of database clusters, elements of the time-series data within the first portion of the spatial boundaries and the later portion of the temporal boundaries; and storing, by the storage node into the third tile in the plurality of database clusters, elements of the time-series data within the second portion of the spatial boundaries and the later portion of the temporal boundaries.

Clause 34. The one or more non-transitory computer-readable storage media as recited in clause 33, wherein the second tile and the third tile are stored using different ones of the database clusters.

Clause 35. The one or more non-transitory computer-readable storage media as recited in clause 33, wherein the temporal boundaries are split into an earlier portion and the later portion at or after a current point in time, and wherein elements of the time-series data within the spatial boundaries and the earlier portion of the temporal boundaries are maintained in the first tile in a first database cluster of the plurality of database clusters.

Clause 36. The one or more non-transitory computer-readable storage media as recited in clause 35, further comprising additional program instructions that, when executed on or across the one or more processors, perform:
performing, by a query processor using the first tile, a query of the elements of the time-series data within the spatial boundaries and the earlier portion of the temporal boundaries.

Clause 37. The one or more non-transitory computer-readable storage media as recited in clause 33, further comprising additional program instructions that, when executed on or across the one or more processors, perform:
determining, by the time-series database storing a fourth tile, that a heat metric for the fourth tile has exceeded the threshold, wherein the fourth tile represents additional spatial boundaries and additional temporal boundaries of the time-series data, wherein a lease for the fourth tile is assigned to the storage node, and wherein the heat metric for the fourth tile has exceeded the threshold at a point in time after an ending time of the additional temporal boundaries; and
performing a spatial split of the fourth tile, wherein the spatial split of the fourth tile generates a fifth tile representing a first portion of the additional spatial boundaries and the additional temporal boundaries, and wherein the spatial split of the fourth tile generates a sixth tile representing a second portion of the additional spatial boundaries and the additional temporal boundaries.

Clause 38. The one or more non-transitory computer-readable storage media as recited in clause 33, further comprising additional program instructions that, when executed on or across the one or more processors, perform:
determining, by the storage node using a placement service, a first database cluster of the plurality of database clusters in which the second tile is stored and a second database cluster of the plurality of database clusters in which the third tile is stored.

Clause 39. The one or more non-transitory computer-readable storage media as recited in clause 33, further comprising additional program instructions that, when executed on or across the one or more processors, perform:
determining, by the storage node, that a heat metric for a fourth tile has passed below a second threshold, wherein the fourth tile represents second spatial boundaries and second temporal boundaries of the time-series data, and wherein a lease for the fourth tile is assigned to the storage node;
identifying, by the storage node, a fifth tile having third temporal boundaries and adjacent spatial boundaries to the second spatial boundaries, wherein the heat metric for the fifth tile has passed below the second threshold; and
performing a temporal split of the fourth tile, wherein the temporal split of the fourth tile generates a sixth tile representing the second spatial boundaries and a later portion of the second temporal boundaries, and wherein a lease for the sixth tile is assigned to the storage node;
performing a temporal split of the fifth tile, wherein the temporal split of the fifth tile generates a seventh tile representing the adjacent spatial boundaries and the later portion of the second temporal boundaries, and wherein a lease for the seventh tile is assigned to the storage node;
performing a merge of the fifth tile and the seventh tile into an eighth tile, wherein the eighth tile represents the second spatial boundaries, the adjacent spatial boundaries, and the later portion of the second temporal boundaries, and wherein a lease for the eighth tile is assigned to the storage node.

Clause 40. The one or more non-transitory computer-readable storage media as recited in clause 33, wherein the heat metric is indicative of a rate of writing elements of the time-series data within the spatial and temporal boundaries of the first tile.

Furthermore, the foregoing may be better understood in view of the following clauses:

Clause 41. A system, comprising:
a distributed time-series database comprising a plurality of storage nodes including a first storage node and a plurality of database clusters, wherein the distributed time-series database stores time-series data of a plurality of time series using the plurality of database clusters, wherein leases for a plurality of tiles representing spatial and temporal partitions of the time-series data are assigned to the first storage node, and wherein the distributed time-series database comprises a plurality of processors and a plurality of memories to store computer-executable instructions that, when executed, cause the processors to:
determine that a heat metric for the first storage node has exceeded a threshold, wherein the heat metric is indicative of a throughput of elements of the time-series data at the first storage node;
determine respective heat metrics for two or more additional storage nodes including a second storage node of the plurality of storage nodes;
select the second storage node based at least in part on the respective heat metrics, wherein the second storage node has a lower heat metric than at least one of the additional storage nodes;
reassign one or more of the leases for one or more of the tiles from the first storage node to the second storage node; and
store, by the second storage node into the plurality of database clusters, elements of the time-series data for the one or more reassigned leases.

Clause 42. The system as recited in clause 41, wherein the plurality of memories store additional computer-executable instructions that, when executed, cause the processors to:
determine that an additional heat metric for a first database cluster of the plurality of database clusters of the time-series database has exceeded an additional threshold, wherein the first database cluster stores a plurality of additional tiles;

perform a temporal split on a particular tile of plurality of additional tiles, wherein the particular tile has additional spatial boundaries and additional temporal boundaries, wherein the temporal split generates a first new tile having the additional spatial boundaries and an earlier portion of the additional temporal boundaries, and wherein the temporal split generates a second new tile having the additional spatial boundaries and a later portion of the additional temporal boundaries; and store additional elements of the time-series data in the second new tile in a second database cluster of the plurality of database clusters.

Clause 43. The system as recited in clause 42, wherein the additional temporal boundaries are split into the earlier portion and the later portion at or after a current point in time, and wherein elements of the time-series data within the additional spatial boundaries and the earlier portion of the additional temporal boundaries are maintained in the particular tile in the first database cluster.

Clause 44. The system as recited in clause 41, wherein the plurality of memories store additional computer-executable instructions that, when executed, cause the processors to:

initiate, by the first storage node, a lease exchange between the first storage node and a second storage node, wherein the first storage node has a first connection to a first database cluster of the plurality of database clusters for storing a first one or more tiles using the first database cluster, and wherein the second storage node has a second connection to the first database cluster for storing a second one or more tiles using the first database cluster;

transfer one or more leases for the second one or more tiles from the second storage node to the first storage node; and transfer one or more additional leases for an additional one or more tiles stored by a second database cluster from the first storage node to the second storage node.

Clause 45. A method, comprising:

determining, by a time-series database, that a heat metric for a first storage node of the time-series database has exceeded a threshold, wherein the time-series database stores time-series data of a plurality of time series using a plurality of database clusters, and wherein a plurality of leases for a plurality of tiles representing spatial and temporal partitions of the time-series data are assigned to the first storage node;

determining, by the time-series database, respective heat metrics for two or more additional storage nodes including a second storage node;

selecting, by the time-series database, the second storage node based at least in part on the respective heat metrics;

reassigning, by the time-series database, one or more of the leases for one or more of the tiles from the first storage node to the second storage node; and storing, by the second storage node into the plurality of database clusters, elements of the time-series data in one or more tiles associated with the one or more reassigned leases.

Clause 46. The method as recited in clause 45, wherein the first storage note determines that the heat metric for the first storage node has exceeded the threshold, and wherein an additional storage node determines that a heat metric for the additional storage node has exceeded the threshold.

Clause 47. The method as recited in clause 45, wherein the heat metric for the second storage node is lower than the heat metrics for the first storage node and the additional storage nodes.

Clause 48. The method as recited in clause 45, further comprising:

determining, by the time-series database, that an additional heat metric for a first database cluster of the plurality of database clusters of the time-series database has exceeded an additional threshold, wherein the first database cluster stores a plurality of additional tiles;

performing, by the time-series database, a temporal split on a particular tile of plurality of additional tiles, wherein the particular tile has additional spatial boundaries and additional temporal boundaries, wherein the temporal split generates a first new tile having the additional spatial boundaries and an earlier portion of the additional temporal boundaries, and wherein the temporal split generates a second new tile having the additional spatial boundaries and a later portion of the additional temporal boundaries; and storing, by the time-series database, additional elements of the time-series data in the second new tile in a second database cluster of the plurality of database clusters.

Clause 49. The method as recited in clause 48, wherein the additional temporal boundaries are split into the earlier portion and the later portion at or after a current point in time, and wherein elements of the time-series data within the additional spatial boundaries and the earlier portion of the additional temporal boundaries are maintained in the particular tile in the first database cluster.

Clause 50. The method as recited in clause 48, wherein the plurality of additional tiles are randomly or pseudo-randomly assigned to the first database cluster.

Clause 51. The method as recited in clause 45, further comprising:

initiating, by the first storage node, a lease exchange between the first storage node and a second storage node, wherein the first storage node has a first connection to a first database cluster of the plurality of database clusters for storing a first one or more tiles, and wherein the second storage node has a second connection to the first database cluster for storing a second one or more tiles;

transferring one or more leases for the second one or more tiles from the second storage node to the first storage node; and transferring one or more additional leases for an additional one or more tiles stored by a second database cluster from the first storage node to the second storage node.

Clause 52. The method as recited in clause 51, wherein the number of connections to the first database cluster are reduced by the transferring the one or more leases for the second one or more tiles from the second storage node to the first storage node, and wherein a number of connections to the second database cluster are reduced by the transferring the one or more additional leases for the additional one or more tiles stored from the first storage node to the second storage node.

Clause 53. One or more non-transitory computer-readable storage media storing program instructions that, when executed on or across one or more processors, perform:

determining, by a distributed time-series database, that a heat metric for a first storage node of the time-series database has exceeded a threshold, wherein the distributed time-series database stores time-series data of a plurality of time series using a plurality of database clusters, and wherein a plurality of leases for a plurality of tiles representing spatial and temporal partitions of the time-series data are assigned to the first storage node;

determining, by the distributed time-series database, respective heat metrics for two or more additional storage nodes including a second storage node;

selecting, by the distributed time-series database, the second storage node based at least in part on the respective heat metrics;

reassigning, by the distributed time-series database, one or more of the leases for one or more of the tiles from the first storage node to the second storage node; and storing, by the second storage node into the plurality of database clusters, elements of the time-series data in one or more tiles associated with the one or more reassigned leases.

Clause 54. The one or more non-transitory computer-readable storage media as recited in clause 53, wherein the plurality of leases for the plurality of tiles are randomly or pseudo-randomly assigned to the first storage node.

Clause 55. The one or more non-transitory computer-readable storage media as recited in clause 53, wherein the heat metric for the second storage node is lower than the heat metrics for the first storage node and the additional storage nodes.

Clause 56. The one or more non-transitory computer-readable storage media as recited in clause 53, further comprising additional program instructions that, when executed on or across the one or more processors, perform:
determining, by the distributed time-series database, that an additional heat metric for a first database cluster of the plurality of database clusters of the distributed time-series database has exceeded an additional threshold, wherein the first database cluster stores a plurality of additional tiles;

performing, by the distributed time-series database, a temporal split on a particular tile of plurality of additional tiles, wherein the particular tile has additional spatial boundaries and additional temporal boundaries, wherein the temporal split generates a first new tile having the additional spatial boundaries and an earlier portion of the additional temporal boundaries, and wherein the temporal split generates a second new tile having the additional spatial boundaries and a later portion of the additional temporal boundaries; and storing, by the distributed time-series database, additional elements of the time-series data in the second new tile in a second database cluster of the plurality of database clusters.

Clause 57. The one or more non-transitory computer-readable storage media as recited in clause 56, wherein the additional temporal boundaries are split into the earlier portion and the later portion at or after a current point in time, and wherein elements of the time-series data within the additional spatial boundaries and the earlier portion of the additional temporal boundaries are maintained in the particular tile in the first database cluster.

Clause 58. The one or more non-transitory computer-readable storage media as recited in clause 56, wherein the plurality of additional tiles are randomly or pseudo-randomly assigned to the first database cluster.

Clause 59. The one or more non-transitory computer-readable storage media as recited in clause 53, further comprising additional program instructions that, when executed on or across the one or more processors, perform:
determining, by the distributed time-series database, that a number of connections to a first database cluster of the plurality of database clusters exceeds a connection threshold, wherein the first storage node has a first one of the connections for storing a first one or more tiles using the first database cluster, and wherein a second storage node has a second one of the connections for storing a second one or more tiles using the first database cluster;

transferring one or more leases for the second one or more tiles from the second storage node to the first storage node; and transferring one or more additional leases for an additional one or more tiles stored by a second database cluster from the first storage node to the second storage node.

Clause 60. The one or more non-transitory computer-readable storage media as recited in clause 59, wherein the number of connections to the first database cluster are reduced by the transferring the one or more leases for the second one or more tiles from the second storage node to the first storage node, and wherein a number of connections to the second database cluster are reduced by the transferring the one or more additional leases for the additional one or more tiles stored from the first storage node to the second storage node.

What is claimed is:

1. A system, comprising:
a distributed time-series database comprising one or more storage nodes including a first storage node and a plurality of database clusters, wherein the distributed time-series database stores time-series data of a plurality of time series using the plurality of database clusters, wherein a lease for a first tile representing spatial boundaries and temporal boundaries of the time-series data is assigned to the first storage node, and wherein the distributed time-series database comprises a plurality of processors and a plurality of memories to store computer-executable instructions that, when executed, cause the processors to:
determine that a heat metric for the first tile has exceeded a threshold, wherein the heat metric is indicative of a rate of storing elements of the time-series data within the spatial and temporal boundaries of the first tile;

perform a temporal split of the first tile based at least in part on the heat metric, wherein the temporal split generates an intermediate tile representing the spatial boundaries and a later portion of the temporal boundaries, wherein the later portion of the temporal boundaries begins at or after a current point in time, and wherein the later portion of the temporal boundaries are associated with portions of the time-series data to be received at or after the current point in time;

perform a spatial split of the intermediate tile, wherein the spatial split generates a second tile representing a first portion of the spatial boundaries and the later portion of the temporal boundaries, and wherein the spatial split generates a third tile representing a second portion of the spatial boundaries and the later portion of the temporal boundaries;

store, by the first storage node into the second tile in the plurality of database clusters, elements of the time-series data within the first portion of the spatial boundaries and the later portion of the temporal boundaries; and store, by the first storage node into the third tile in the plurality of database clusters, elements of the time-series data within the second portion of the spatial boundaries and the later portion of the temporal boundaries.

2. The system as recited in claim 1, wherein the second tile and the third tile are stored using different ones of the database clusters.

3. The system as recited in claim 1, wherein the temporal boundaries are split into an earlier portion and the later portion at or after the current point in time, and wherein elements of the time-series data within the spatial boundaries and the earlier portion of the temporal boundaries are maintained in the first tile in a particular database cluster of the plurality of database clusters.

4. The system as recited in claim 1, wherein a lease for the second tile is assigned to the first storage node, and wherein a lease for the third tile is assigned to the first storage node.

5. A method, comprising:

determining, by a time-series database storing a first tile, that a heat metric for the first tile has exceeded a threshold, wherein the time-series database stores time-series data of a plurality of time series using a plurality of database clusters, wherein the first tile represents spatial boundaries and temporal boundaries of the time-series data, and wherein a lease for the first tile is assigned to a storage node;

performing a split of the first tile based at least in part on the heat metric, wherein performing the split comprises:

determining a temporal split point in the temporal boundaries of the first tile;

generating a second tile representing a first portion of the spatial boundaries and a later portion of the temporal boundaries after the temporal split point, wherein the later portion of the temporal boundaries are associated with portions of the time-series data to be received at or after the current point in time; and generating a third tile representing a second portion of the spatial boundaries and the later portion of the temporal boundaries after the temporal split point;

storing, by the storage node into the second tile in the plurality of database clusters, elements of the time-series data within the first portion of the spatial boundaries and the later portion of the temporal boundaries; and storing, by the storage node into the third tile in the plurality of database clusters, elements of the time-series data within the second portion of the spatial boundaries and the later portion of the temporal boundaries.

6. The method as recited in claim 5, wherein the second tile and the third tile are stored using different ones of the database clusters.

7. The method as recited in claim 5, wherein elements of the time-series data within the spatial boundaries and the earlier portion of the temporal boundaries are maintained in the first tile in a first database cluster of the plurality of database clusters.

8. The method as recited in claim 7, further comprising:

performing, by a query processor using the first tile, a query of the elements of the time-series data within the spatial boundaries and the earlier portion of the temporal boundaries.

9. The method as recited in claim 5, further comprising:

determining, by the time-series database storing a fourth tile, that a heat metric for the fourth tile has exceeded the threshold, wherein the fourth tile represents additional spatial boundaries and fourth temporal boundaries of the time-series data, wherein a lease for the fourth tile is assigned to the storage node, and wherein the heat metric for the fourth tile has exceeded the threshold at a point in time after an ending time of the additional temporal boundaries; and performing a spatial split of the fourth tile, wherein the spatial split of the fourth tile generates a fifth tile representing a first portion of the additional spatial boundaries and the additional temporal boundaries, wherein the spatial split of the fourth tile generates a sixth tile representing a second portion of the additional spatial boundaries and the additional temporal boundaries, wherein the fourth tile is stored using a first database cluster of the plurality of database clusters, wherein the fifth tile is stored using a second database cluster of the plurality of database clusters, and wherein the sixth tile is stored using a third database cluster of the plurality of database clusters.

10. The method as recited in claim 5, further comprising:

determining, by the storage node using a placement service, a first database cluster of the plurality of database clusters in which the second tile is stored and a second database cluster of the plurality of database clusters in which the third tile is stored.

11. The method as recited in claim 5, further comprising:

determining, by the storage node, that a heat metric for a fourth tile has passed below a second threshold, wherein the fourth tile represents second spatial boundaries and second temporal boundaries of the time-series data, and wherein a lease for the fifth tile is assigned to the storage node;

identifying, by the storage node, a fifth tile having third temporal boundaries and adjacent spatial boundaries to the second spatial boundaries; and performing a temporal split of the fourth tile, wherein the temporal split of the fourth tile generates a sixth tile representing the second spatial boundaries and a later portion of the second temporal boundaries, and wherein a lease for the sixth tile is assigned to the storage node;

performing a temporal split of the fifth tile, wherein the temporal split of the fifth tile generates a seventh tile representing the adjacent spatial boundaries and the later portion of the second temporal boundaries, and wherein a lease for the seventh tile is assigned to the storage node;

performing a merge of the fifth tile and the seventh tile into an eighth tile, wherein the eighth tile represents the second spatial boundaries, the adjacent spatial boundaries, and the later portion of the second temporal boundaries, and wherein a lease for the eighth tile is assigned to the storage node.

12. The method as recited in claim 5, wherein the heat metric is indicative of a rate of throughput for elements of the time-series data within the spatial and temporal boundaries of the first tile.

13. One or more non-transitory computer-readable storage media storing program instructions that, when executed on or across one or more processors, perform:

determining, by a time-series database storing a first tile, that a heat metric for the first tile has exceeded a threshold, wherein the time-series database stores time-series data of a plurality of time series using a plurality of database clusters, wherein the first tile represents spatial boundaries and temporal boundaries of the time-series data, and wherein a lease for the first tile is assigned to a storage node;

performing a temporal split of the first tile based at least in part on the heat metric, wherein the temporal split generates a temporary tile representing the spatial boundaries and a later portion of the temporal boundaries, wherein the later portion of the temporal boundaries are associated with portions of the time-series data to be received at or after the current point in time;

performing a spatial split of the temporary tile, wherein the spatial split generates a second tile representing a first portion of the spatial boundaries and the later portion of the temporal boundaries, and wherein the spatial split generates a third tile representing a second portion of the spatial boundaries and the later portion of the temporal boundaries;

storing, by the storage node into the second tile in the plurality of database clusters, elements of the time-series data within the first portion of the spatial boundaries and the later portion of the temporal boundaries; and storing, by the storage node into the third tile in the plurality of database clusters, elements of the time-series data within the second portion of the spatial boundaries and the later portion of the temporal boundaries.

14. The one or more non-transitory computer-readable storage media as recited in claim 13, wherein the second tile and the third tile are stored using different ones of the database clusters.

15. The one or more non-transitory computer-readable storage media as recited in claim 13, wherein elements of the time-series data within the spatial boundaries and the earlier portion of the temporal boundaries are maintained in the first tile in a first database cluster of the plurality of database clusters.

16. The one or more non-transitory computer-readable storage media as recited in claim 15, further comprising additional program instructions that, when executed on or across the one or more processors, perform:

performing, by a query processor using the first tile, a query of the elements of the time-series data within the spatial boundaries and the earlier portion of the temporal boundaries.

17. The one or more non-transitory computer-readable storage media as recited in claim 13, further comprising additional program instructions that, when executed on or across the one or more processors, perform:

determining, by the time-series database storing a fourth tile, that a heat metric for the fourth tile has exceeded the threshold, wherein the fourth tile represents additional spatial boundaries and additional temporal boundaries of the time-series data, wherein a lease for the fourth tile is assigned to the storage node, and wherein the heat metric for the fourth tile has exceeded the threshold at a point in time after an ending time of the additional temporal boundaries; and performing a spatial split of the fourth tile, wherein the spatial split of the fourth tile generates a fifth tile representing a first portion of the additional spatial boundaries and the additional temporal boundaries, and wherein the spatial split of the fourth tile generates a sixth tile representing a second portion of the additional spatial boundaries and the additional temporal boundaries.

18. The one or more non-transitory computer-readable storage media as recited in claim 13, further comprising additional program instructions that, when executed on or across the one or more processors, perform:

determining, by the storage node using a placement service, a first database cluster of the plurality of database clusters in which the second tile is stored and a second database cluster of the plurality of database clusters in which the third tile is stored.

19. The one or more non-transitory computer-readable storage media as recited in claim 13, further comprising additional program instructions that, when executed on or across the one or more processors, perform:

determining, by the storage node, that a heat metric for a fourth tile has passed below a second threshold, wherein the fourth tile represents second spatial boundaries and second temporal boundaries of the time-series data, and wherein a lease for the fourth tile is assigned to the storage node;

identifying, by the storage node, a fifth tile having third temporal boundaries and adjacent spatial boundaries to the second spatial boundaries, wherein the heat metric for the fifth tile has passed below the second threshold; and performing a temporal split of the fourth tile, wherein the temporal split of the fourth tile generates a sixth tile representing the second spatial boundaries and a later portion of the second temporal boundaries, and wherein a lease for the sixth tile is assigned to the storage node;

performing a temporal split of the fifth tile, wherein the temporal split of the fifth tile generates a seventh tile representing the adjacent spatial boundaries and the later portion of the second temporal boundaries, and wherein a lease for the seventh tile is assigned to the storage node;

performing a merge of the fifth tile and the seventh tile into an eighth tile, wherein the eighth tile represents the second spatial boundaries, the adjacent spatial boundaries, and the later portion of the second temporal boundaries, and wherein a lease for the eighth tile is assigned to the storage node.

20. The one or more non-transitory computer-readable storage media as recited in claim 13, wherein the heat metric is indicative of a rate of writing elements of the time-series data within the spatial and temporal boundaries of the first tile.

\* \* \* \* \*